United States Patent
Truthseeker

(10) Patent No.: US 10,630,228 B2
(45) Date of Patent: Apr. 21, 2020

(54) SYSTEMS AND METHODS FOR MOUNTING ROOF-MOUNTED PHOTOVOLTAIC ARRAYS INCLUDING FLASHING AND TAPE

(71) Applicant: Samuel Marcus-Flack Truthseeker, El Sobrante, CA (US)

(72) Inventor: Samuel Marcus-Flack Truthseeker, El Sobrante, CA (US)

(*) Notice: Subject to any disclaimer, the term of this patent is extended or adjusted under 35 U.S.C. 154(b) by 0 days.

(21) Appl. No.: 15/726,151

(22) Filed: Oct. 5, 2017

(65) Prior Publication Data

US 2018/0097470 A1 Apr. 5, 2018

Related U.S. Application Data

(60) Provisional application No. 62/404,387, filed on Oct. 5, 2016.

(51) Int. Cl.

| | | |
|---|---|---|
| *H02S 20/23* | (2014.01) | |
| *E04B 1/66* | (2006.01) | |
| *E04D 13/04* | (2006.01) | |
| *E04D 13/147* | (2006.01) | |
| *E04C 2/30* | (2006.01) | |
| *E04D 13/14* | (2006.01) | |
| *H02S 30/00* | (2014.01) | |
| *H02S 20/30* | (2014.01) | |
| *E04D 13/143* | (2006.01) | |

(52) U.S. Cl.
CPC .............. *H02S 20/23* (2014.12); *E04B 1/665* (2013.01); *E04C 2/30* (2013.01); *E04D 13/0404* (2013.01); *E04D 13/147* (2013.01); *E04D 13/1407* (2013.01); *E04D 13/1473* (2013.01); *E04D 13/1476* (2013.01); *H02S 20/30* (2014.12); *H02S 30/00* (2013.01); *E04D 13/143* (2013.01); *Y02B 10/12* (2013.01); *Y02E 10/50* (2013.01)

(58) Field of Classification Search
CPC ... E04B 1/665; E04D 13/0404; E04D 13/147; E04D 13/1473; E04D 13/1407; E04D 13/1476; E04D 13/143; E04D 13/1475; H02S 20/23; H02S 20/30; H02S 30/00
See application file for complete search history.

(56) References Cited

U.S. PATENT DOCUMENTS

| | | | | |
|---|---|---|---|---|
| 2,490,220 | A | * 12/1949 | Leslie | ............... E04D 13/03 |
| | | | | 454/366 |
| 4,972,638 | A | * 11/1990 | Minter | ............ E04D 13/031 |
| | | | | 52/200 |

(Continued)

*Primary Examiner* — Brian D Mattei
(74) *Attorney, Agent, or Firm* — Armstrong Teasdale LLP

(57) ABSTRACT

A system for flashing a mount of a photovoltaic assembly on a surface includes a flashing assembly. The flashing assembly includes flashing that extends across an interface of the mount and the surface when the mount is attached to the surface. The flashing assembly also includes tape attached to the flashing. The tape includes a first attachment area and a second attachment area. The flashing assembly has a first configuration in which the first attachment area is attached to the flashing and the second attachment area is unattached, and a second configuration in which the first attachment area is attached to the flashing and the second attachment area is attached to the surface. The tape is movable with the flashing as an assembly when the flashing assembly is in the first configuration.

17 Claims, 30 Drawing Sheets

(56) References Cited

U.S. PATENT DOCUMENTS

| | | | | |
|---|---|---|---|---|
| 6,327,820 B1 * | 12/2001 | Picco | ............. | E04D 13/02 |
| | | | | 52/58 |
| 8,316,592 B2 * | 11/2012 | Lanza | ............. | E04D 1/30 |
| | | | | 52/173.3 |
| 8,713,858 B1 * | 5/2014 | Xie | ............. | E04D 13/147 |
| | | | | 52/58 |
| 8,869,470 B2 * | 10/2014 | Lanza | ............. | E04D 1/30 |
| | | | | 52/173.3 |
| 10,138,634 B2 * | 11/2018 | Erekson | ............. | E04D 13/1476 |
| 2006/0081322 A1 * | 4/2006 | Wiercinski | ............. | E06B 1/62 |
| | | | | 156/71 |
| 2009/0013620 A1 * | 1/2009 | West | ............. | E04D 13/1476 |
| | | | | 52/198 |
| 2009/0320987 A1 * | 12/2009 | Hubbard | ............. | B32B 7/06 |
| | | | | 156/71 |
| 2011/0232225 A1 * | 9/2011 | Margarites | ............. | E04D 13/1407 |
| | | | | 52/741.4 |
| 2012/0085063 A1 * | 4/2012 | Pufahl | ............. | B32B 3/30 |
| | | | | 52/741.4 |
| 2012/0204508 A1 * | 8/2012 | Kalwara | ............. | E04D 13/1407 |
| | | | | 52/309.3 |
| 2016/0153193 A1 * | 6/2016 | McGraw | ............. | E04D 5/142 |
| | | | | 52/801.1 |
| 2016/0237688 A1 * | 8/2016 | Rapsilver | ............. | E04D 13/1476 |
| 2017/0261145 A1 * | 9/2017 | Vargas | ............. | F16L 43/02 |
| 2018/0112410 A1 * | 4/2018 | DeGraan | ............. | E04D 13/14 |
| 2018/0238589 A1 * | 8/2018 | Ash | ............. | H02S 20/23 |

* cited by examiner

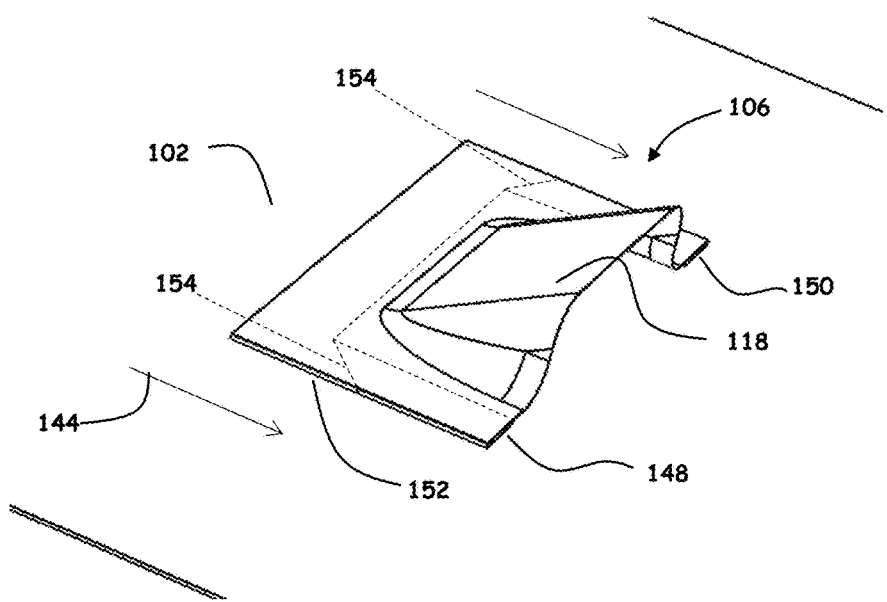
FIG. 13
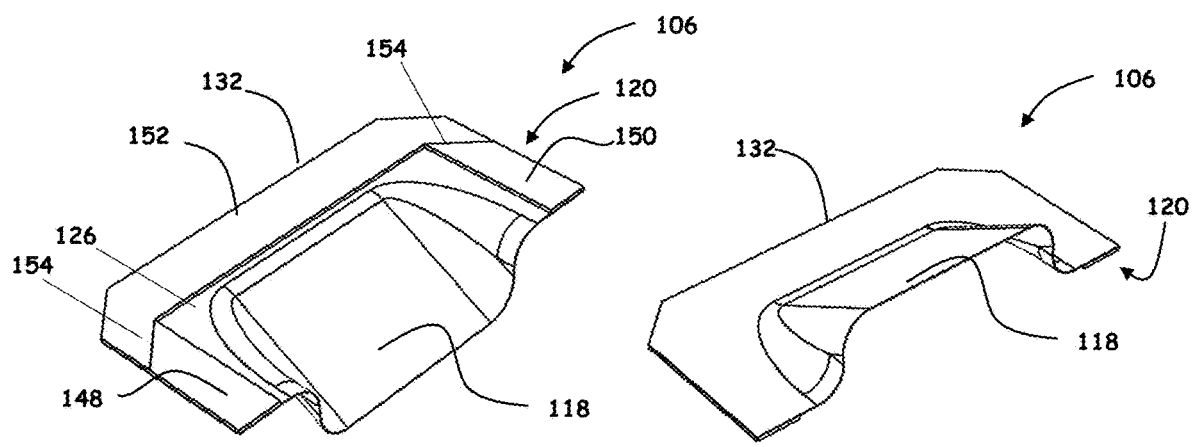
FIG. 14                    FIG. 15

SYSTEMS AND METHODS FOR MOUNTING ROOF-MOUNTED PHOTOVOLTAIC ARRAYS INCLUDING FLASHING AND TAPE

CROSS REFERENCE TO RELATED APPLICATIONS

This application claims priority to U.S. Provisional Application No. 62/404,387, filed Oct. 5, 2016, which is hereby incorporated by reference in its entirety.

FIELD

This disclosure generally relates to flashing mounting systems for roof-mounted photovoltaic arrays and, more specifically, to flashing assemblies including flashing and tape.

BACKGROUND

Photovoltaic (PV) modules may be mounted to a surface of a structure such as a roof to form PV arrays. Each PV module may be mounted to the surface by mounts that secure the PV module to the surface and elevate the PV module above the surface. For example, the mounts may include hooks and/or stanchions. Sometimes, securing each mount to the surface causes one or more penetrations in the surface. Typically, photovoltaic arrays require numerous mounts and, thus, numerous penetrations in the surface. However, such penetrations may need to be sealed to prevent water intrusion into the structure through the penetrations. Accordingly, flashing may be positioned on the mounts and over each penetration. The interface of the flashing and the surface may be sealed using sealant materials. For example, flashing on roofs may be sealed by applying a viscous roofing sealant and layers of mesh materials. However, such sealant materials increase the cost and time required to mount the PV modules. In addition, the flashing may be improperly sealed due to installer error and/or use of improper materials.

Accordingly, there is a need for a system that simplifies the process to mount photovoltaic arrays and reduces the opportunities for improper sealing of any penetrations in a surface.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a system for flashing a mount of a photovoltaic assembly on a surface includes a flashing assembly. The flashing assembly includes flashing that extends across an interface of the mount and the surface when the mount is attached to the surface. The flashing assembly also includes tape attached to the flashing. The tape includes a first attachment area and a second attachment area. The flashing assembly has a first configuration in which the first attachment area is attached to the flashing and the second attachment area is unattached, and a second configuration in which the first attachment area is attached to the flashing and the second attachment area is attached to the surface. The tape is movable with the flashing as an assembly when the flashing assembly is in the first configuration.

In another aspect, a package for receiving a flashing assembly includes a container and a receptacle. The container defines an interior space to receive the flashing assembly. The flashing assembly includes flashing and tape attached to the flashing. The tape has an attachment area covered by a release sheet. The receptacle receives the release sheet when the release sheet is removed from the tape to allow the flashing assembly to attach to a surface.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 13 is a perspective view of the flashing assembly shown in FIG. 12 mounted on a surface.

FIG. 14 is a perspective view of the underside of an embodiment of a flashing assembly including tape and flashing having angled edges.

FIG. 15 is a perspective view of the topside of the flashing assembly shown in FIG. 14.

Like reference symbols in the various drawings indicate like elements.

DETAILED DESCRIPTION

Figure 1:
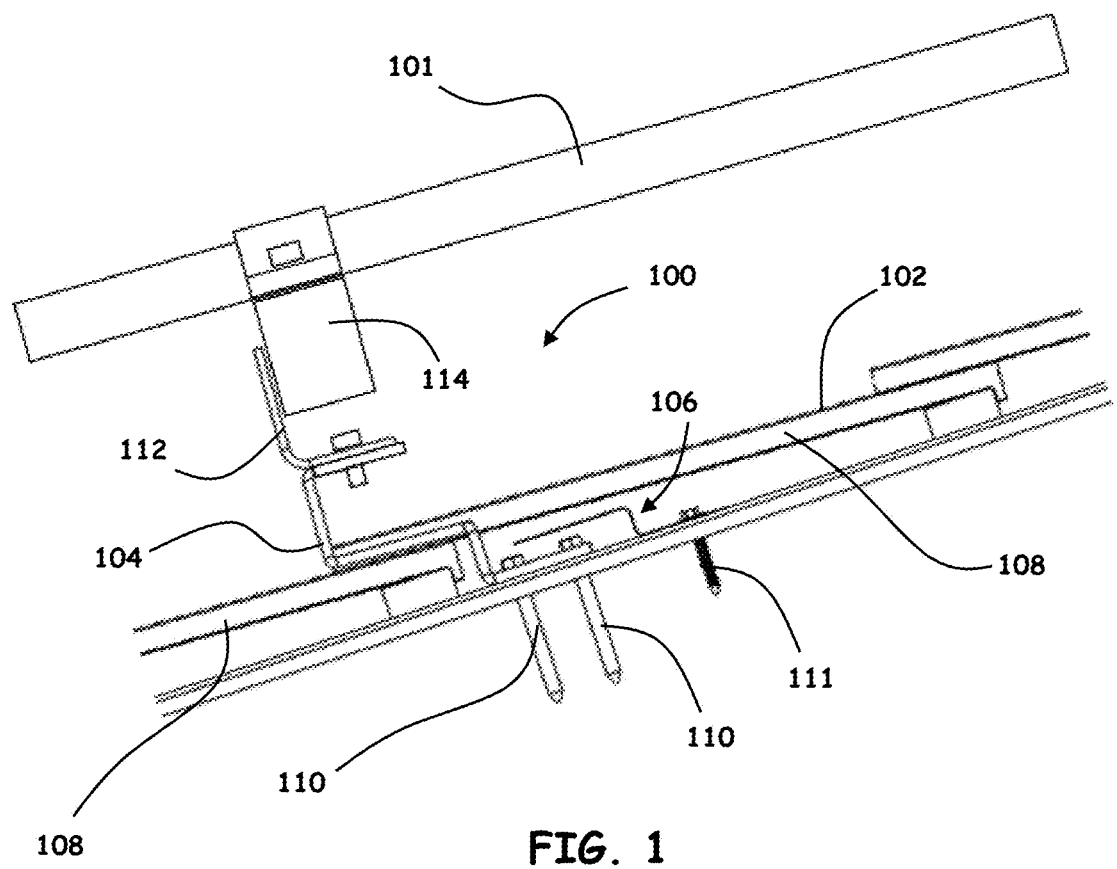
FIG. 1 is a sectional view of a system for mounting a PV module on a surface.
Figure 2:
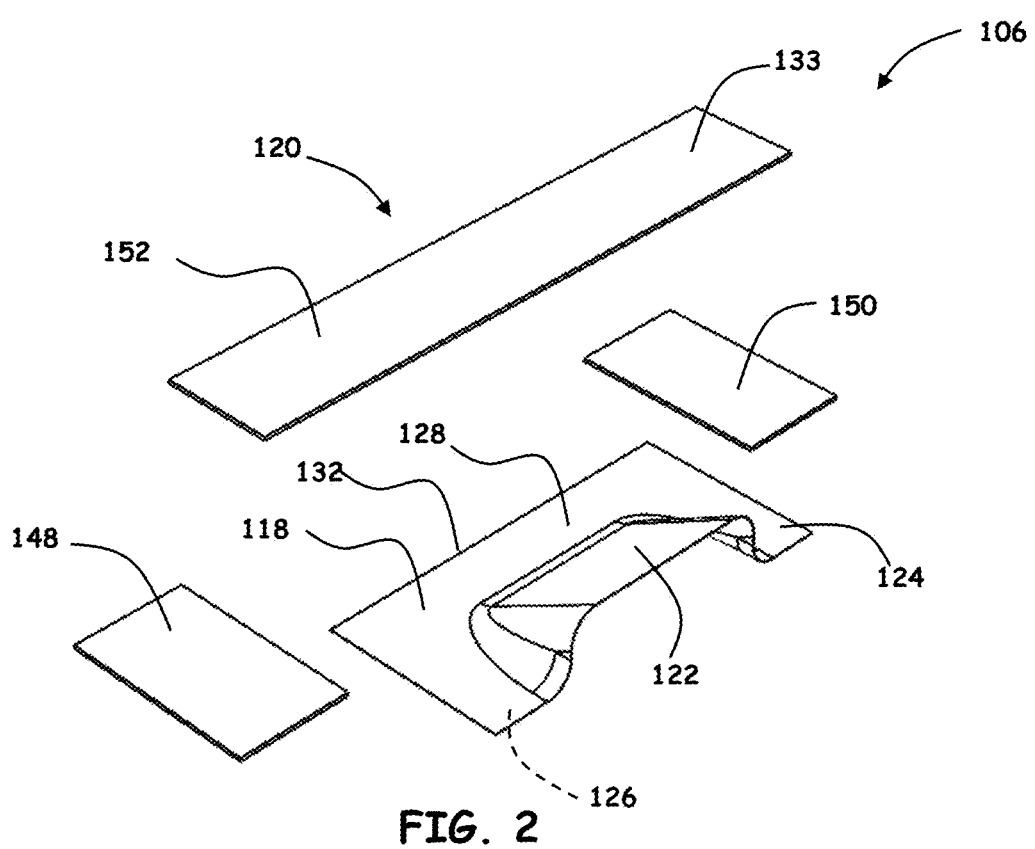
FIG. 2 is an exploded view of an embodiment of a flashing assembly for use with the system shown in FIG. 1.

FIG. 1 is a sectional view of a system 100 for mounting photovoltaic (PV) modules 101 on a surface 102 of a structure. The structure may be, for example, a building having a sloped or flat roof or any other structure suitable for mounting PV modules. The system 100 includes a mount 104 and a flashing assembly 106. In the example, the mount 104 includes a hook for use with roof tiles. The mount 104 is placed against an underlayment of the surface 102 such as roof felt such that the mount extends underneath roof tiles. A portion of the surface 102, such as one or more tiles 108, may be removed to provide access to the underlayment of the surface. Fasteners 110 are secured through the mount 104 and into the structure. In other embodiments, the mount 104 may be secured to the surface 102 using, for example, fasteners, adhesives, and/or any other attachment means.

As an example, embodiments of the systems and methods are described in the context of PV modules. However, the flashing assemblies 106 may be used to flash any penetrations in surfaces. For example, the described embodiments may be used for penetrations in roofs such as penetrations for heating, venting, and air-conditioning systems, plumbing vents, chimneys, mechanical attachments, and any other components requiring penetrations in roofs. The term "penetration" refers to an opening in a surface.

The flashing assembly 106 may be positioned over a portion of the mount 104 and over any openings in the surface 102. As described further below, the flashing assembly 106 includes tape to provide a watertight seal around the flashing assembly. Accordingly, the time required to mount the PV modules 101 is greatly reduced. For example, the total time to install the PV modules may be reduced by as much as 24 hours in comparison to systems that require time for sealant materials to dry or cure. The time required for an installer at each mount 104 may be reduced by as much as 95%. Moreover, the flashing assembly 106 reduces the opportunity for incorrect installation of the flashing assembly. Also, the flashing assembly 106 reduces waste of materials during installation of the PV modules.

When the mount 104 is secured to the surface 102, any removed portions of the surface may be replaced and the PV module 101 may be attached to the mount 104. For example, a bracket 112 may be attached to the mount 104 and a rail 114 attached to the bracket. One or more PV modules 101 may be attached to each rail 114. In other embodiments, the PV modules 101 may be mounted in any manner that enables the PV module 101 to function as described. For example, the PV module 101 and/or the rail 114 may be directly attached to the bracket 112 and/or the mount 104. In addition, each PV module 101 may be attached directly or indirectly to a plurality of mounts 104.

In the example, the mount 104 includes a hook. In other embodiments, the system 100 may include any mount 104 that enables the system to function as described. For example, in some embodiments, the mount 104 may include a stanchion 174 (shown in FIG. 22) that secures to the surface 102 and elevates the PV module above the surface. The footprint and the post of the mount 104 may be rectangular, square, circular, triangular, and/or any other suitable shape.

FIGS. 2-5 show a flashing assembly 106 for use with the system 100. Flashing assembly 106 includes flashing 118 and tape 120. Flashing 118 is sized and shaped to extend across an interface of the mount 104 (shown in FIG. 1) and the surface 102 (shown in FIG. 1). In the example, the flashing 118 includes a sloped or first portion 122 and a second portion 124. The first portion 122 is configured to receive and extend across a portion of the mount 104 (shown in FIG. 1). The second portion 124 is configured to extend along the surface 102 (shown in FIG. 1). In the illustrated embodiment, the first portion 122 is non-planar or sloped and the second portion 124 is planar. In other embodiments, the flashing 118 may include any portions that enable the flashing assembly 106 to function as described.

In addition, the flashing 118 includes a bottom surface 126, a top surface 128, and an edge 132 extending between the top surface and the bottom surface. The bottom surface 126 contacts the surface 102 (shown in FIG. 1) when the flashing 118 is installed on the surface. The flashing 118 may be constructed of metal, plastic, and/or any other material that enables the flashing to function as described. In other embodiments, the flashing assembly 106 may include any flashing 118 that enables the flashing assembly to function as described.

Figure 3:
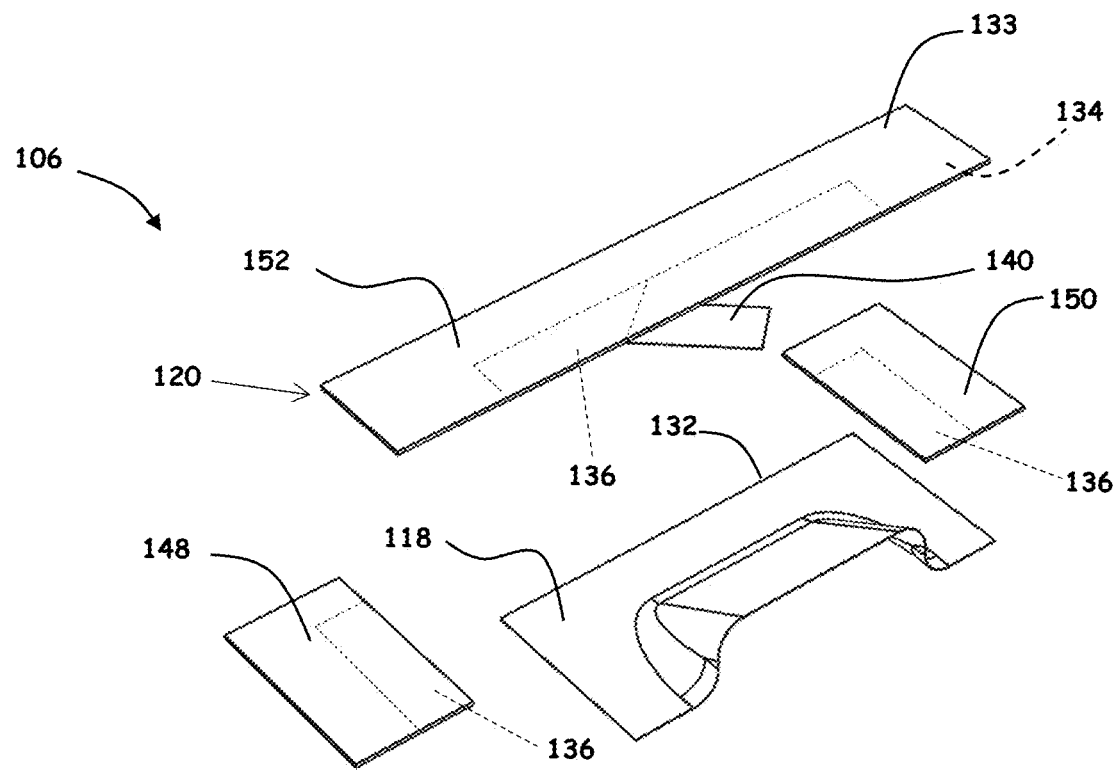
FIG. 3 is a schematic perspective view of the flashing assembly shown in FIG. 2 illustrating removal of release sheets from tape for first attachment area.
Figure 4:
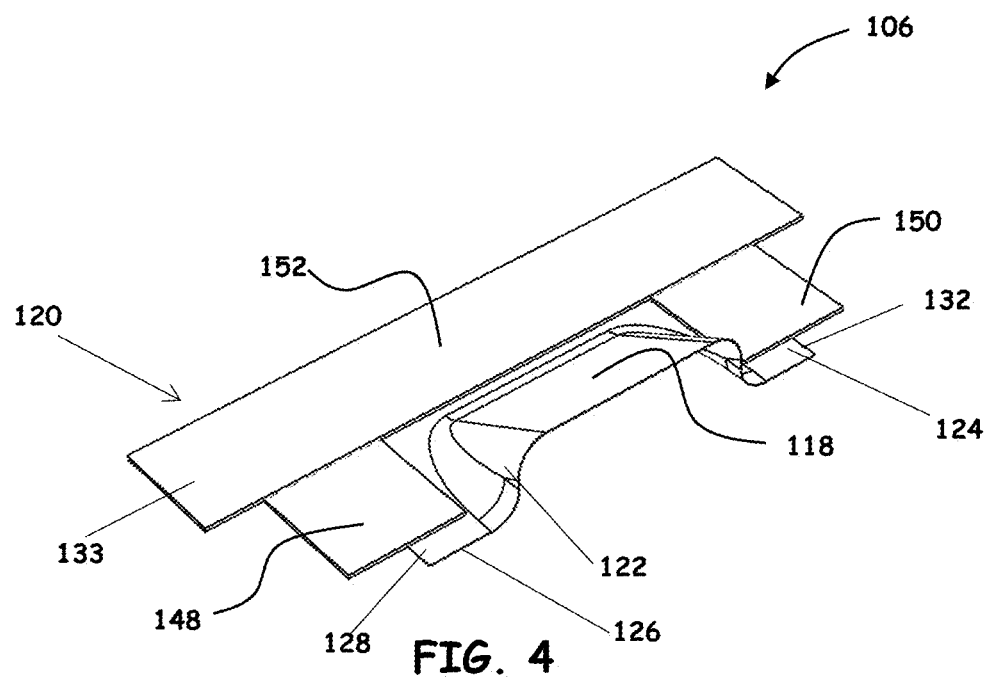
FIG. 4 is a perspective view of the flashing assembly shown in FIGS. 2 and 3 in a first configuration.
Figure 5:
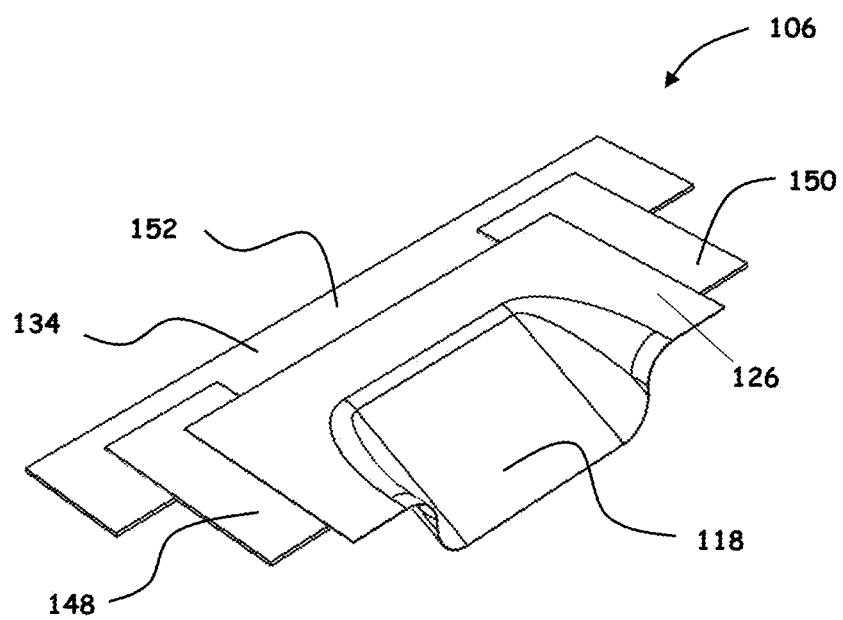
FIG. 5 is a perspective view of the underside of the flashing assembly shown in FIG. 4.
Figure 6:
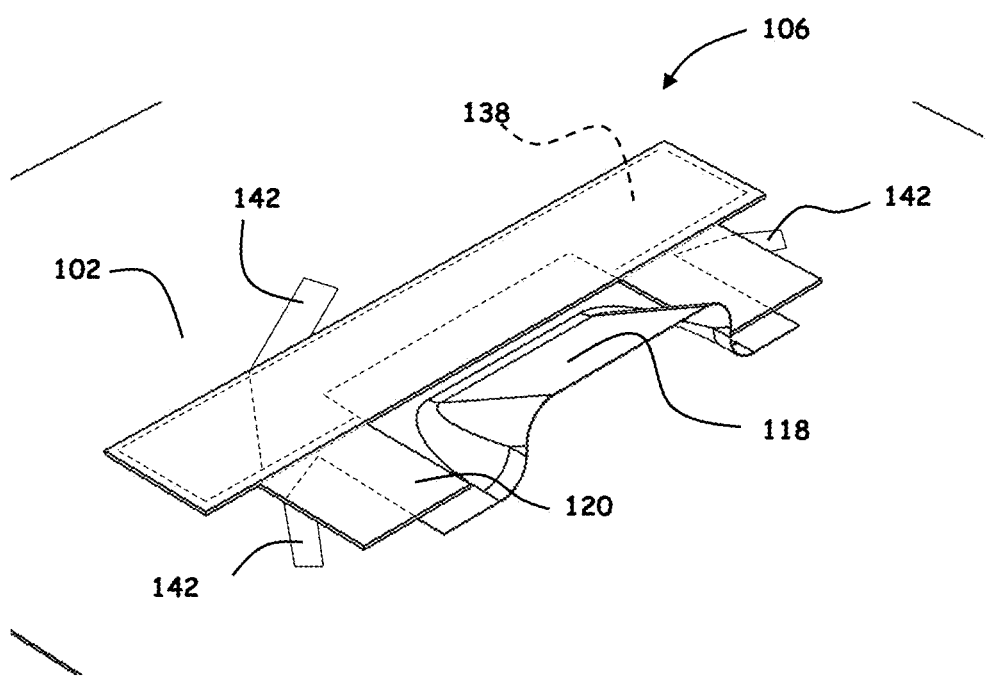
FIG. 6 is a perspective view of the flashing assembly shown in FIGS. 2-5 showing removal of a second set of release sheets from the tape.

In reference to FIGS. 3-5, in this embodiment, the tape 120 includes a top surface 133, a bottom surface 134, a first attachment area 136, and a second attachment area 138 (shown in FIG. 6). The tape 120 includes overlapping strips 148, 150, 152. In this embodiment, the tape 120 includes three rectangular strips 148, 150, 152. The tape 120 is positioned on the top surface 128 of the flashing 118 and extends over the edge 132. Moreover, the strips 148, 150, 152 overlap each other. Such an overlapping configuration may prevent water from penetrating through the flashing assembly 106. In other embodiments, the tape 120 may have any configuration that enables the flashing assembly 106 to function as described. For example, in some embodiments, the tape 120 may include a single continuous strip attached to the flashing 118. In further embodiments, the tape 120 may be attached to the bottom surface 126 (shown in FIG. 11) of the flashing 118.

The flashing assembly 106 has a first configuration and a second configuration. In the first configuration, the first attachment area 136 of the tape 120 is attached to the flashing 118 and the second attachment area 138 (shown in FIG. 6) is unattached. In addition, the tape 120 may be positionable in the first configuration to facilitate positioning the flashing assembly 106 relative to the surface 102 (shown in FIG. 1). In the second configuration, the second attachment area 138 (shown in FIG. 6) may be attached to the surface 102 (shown in FIG. 1) such that the tape 120 extends across an interface between the flashing 118 and the surface. Accordingly, the flashing assembly 106 facilitates flashing the mount 104 (shown in FIG. 1) of the PV module 101 and the surface 102. In particular, the flashing assembly 106 includes all components required to seal penetrations from the mount 104 (shown in FIG. 1) being secured to the surface 102 (shown in FIG. 1).

The term "tape" refers to a material that is configured to stick to a surface when the material contacts the surface. For example, the tape 120 may include an adhesive on the attachment areas 136, 138 (shown in FIGS. 3 and 6) configured to attach to the mount 104 and/or the surface 102 (shown in FIG. 1). In addition, the tape may be designed to seal asphalt, rubber, modified bitumen roofing underlayments, roofing membranes such as TPO (thermoplastic polyefin), EPDM (ethylene propylene diene terpolymer), PVC (polyvinyl chloride), and/or any other surface. In other embodiments, the flashing assembly 106 may include any tape 120 that enables the flashing assembly 106 to function as described. In some embodiments, the tape 120 includes a single, continuous strip attached to the flashing 118.

In reference to FIGS. 3 and 6, the flashing assembly 106 also includes a first release sheet 140 and a second release sheet 142. The first release sheet 140 may be positioned on the first attachment area 136 and the second release sheet 142 may be positioned on the second attachment area 138. The first release sheet 140 may be removed from the first attachment area 136 to allow the first attachment area to attach to the flashing 118 and form the flashing assembly 106. The second release sheet 142 may remain over the second attachment area 138 to prevent objects attaching to the second attachment area when the flashing assembly 106 is in the first configuration. In this embodiment, each release sheet 140, 142 may comprise a plastic or non-adhesive sheet that covers the first attachment area 136 and/or the second attachment area 138. In some embodiments, the release sheet 140, 142 may include a grip to facilitate removal of the release sheet 140, 142. For example, the release sheet 140, 142 may be oversized relative to the respective attachment area 136, 138 such that a portion of the release sheet is exposed for a user to grasp. In other embodiments, the flashing assembly 106 may include any release sheet 140, 142 that enables the flashing assembly to function as described. For example, in some embodiments, the second release sheet 140 is larger than the second attachment area 138 and is sized and shaped to be positioned between flashing assemblies 106 when the flashing assemblies are stacked. In further embodiments, the flashing assembly includes a third release sheet.

Figure 7:
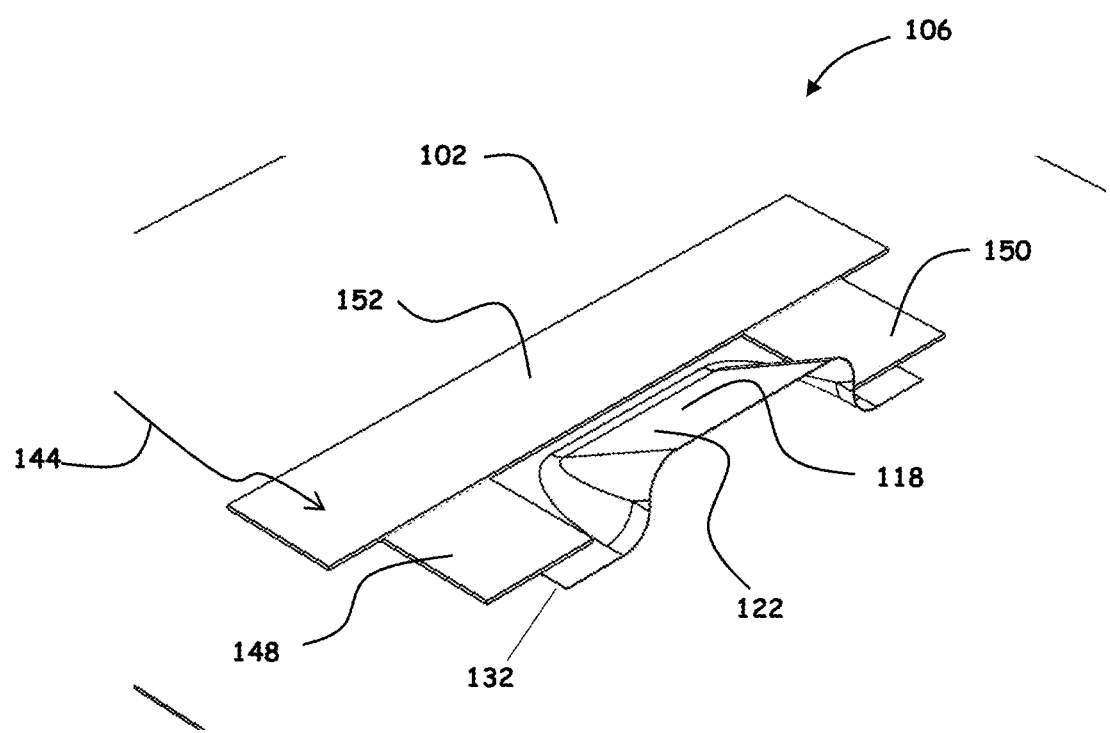
FIG. 7 is a perspective view of the flashing assembly shown in FIGS. 2-6 in the second configuration mounted on a surface.

As shown in FIGS. 6 and 7, the second release sheet 142 may be removed from the second attachment area 138 to allow the second attachment area to attach to the surface 102. The flashing assembly 106 switches from the first configuration to the second configuration when the second attachment area 138 is attached to the surface 102. Thus, the second release sheet 142 inhibits improper attachment of the second attachment area 138 and allows the flashing assembly 106 to be accurately positioned relative to the surface 102. Moreover, the flashing assembly 106 simplifies sealing of the system 100 because the flashing assembly 106 is easily switched from the first configuration (shown in FIGS. 4 and 5) to the second configuration (shown in FIG. 7). On a sloped roof, the flashing assembly 106 and the surface 102 form a watertight seal when the flashing assembly 106 is in the second configuration. In other embodiments, the flashing assembly 106 may be attached to the surface 102 and/or the mount 104 in any manner that enables the flashing assembly 106 to function as described.

Referring again to FIGS. 3 and 6, in some embodiments, substantially the entire bottom surface 134 and/or top surface 133 may include an adhesive defining the first attachment area 136 and the second attachment area 138. In such embodiments, the first attachment area 136 and the second attachment area 138 may be adjacent and the first release sheet 140 and/or the second release sheet 142 may be cut to allow selective exposure of the first attachment area and the second attachment area. In this embodiment, the first release sheet 140 and the second release sheet 142 are precut such that each release sheet is sized to fit the respective attachment area 136, 138. Each release sheet 140, 142 may be removed as a separate piece. In other embodiments, at least one of the release sheets 140, 142 may be omitted. For example, in some embodiments, the flashing assembly 106 may include a single release sheet. In further embodiments, the flashing 118 and/or the tape 120 may be configured to prevent the second attachment area 138 from attaching to the flashing 118. Accordingly, in such embodiments, the second release sheet 142 may be omitted or removed in the first configuration because the flashing assemblies 106 may be stacked without the second attachment area 138 attaching to the flashing 118.

In reference to FIG. 7, the flashing assembly 106 may be attached to the surface 102 and positioned to inhibit water penetration through the surface. In particular, the flashing assembly 106 may be positioned relative to a slope of the surface 102 such that a direction of liquid flow 144 is away from any openings, potential weak points or joints in the flashing assembly. For example, the flashing 118 may be positioned such that the sloped portion 122 slopes away from the surface 102 along a direction of liquid flow 144. In addition, the overlapping tape 120 may be configured such that the liquid 144 flows over a topmost layer of tape first. In addition, the tape 120 may extend beyond edges 132 of the flashing 118. Accordingly, the flashing assembly 106 provides a watertight seal when installed and facilitates compliance with any applicable regulations for mounting the PV modules 101 (shown in FIG. 1) on the surface 102. Moreover, the flashing assembly 106 reduces the opportunities for installer errors because all necessary components may be included in the flashing assembly as a single unit (e.g., the flashing 118 and the tape 120).

In some embodiments, additional attachment means such as fasteners 111 (shown in FIG. 1) and/or additional tape 120 may be used to secure flashing assembly 106 to the surface 102. The additional attachments may reduce the stress on the attachment areas 136, 138 of the fastener assembly. The fasteners 111 may be positioned through the tape 120 such that the tape seals the penetrations of the fasteners 111 and prevents liquid flowing along the fasteners. In the example, the fasteners 111 are not required and flashing assembly 106 may be secured using only tape 120.

Figure 8:
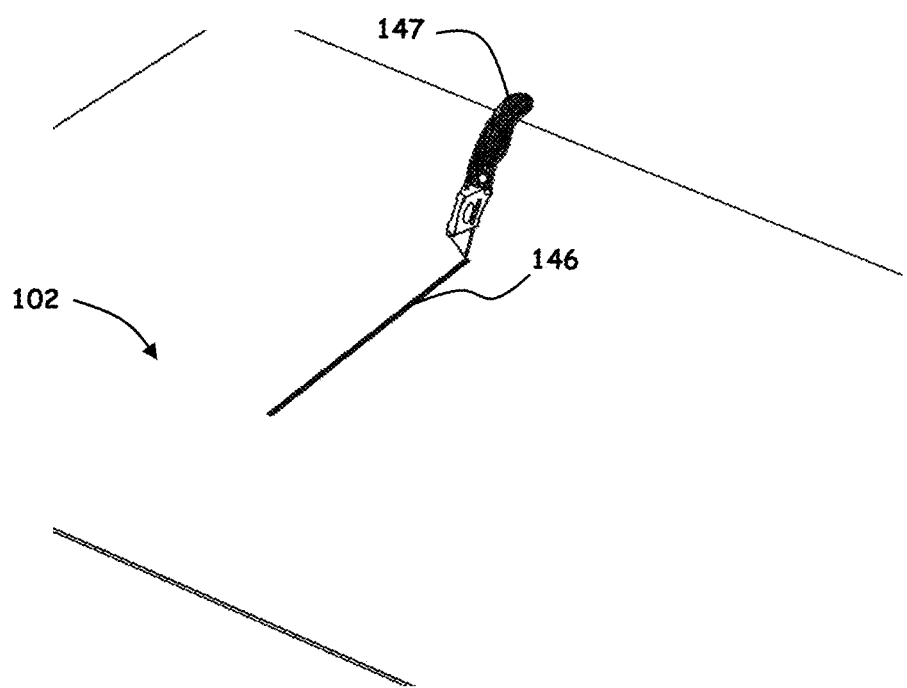
FIG. 8 is a schematic illustration of a surface being prepared for a flashing assembly shown in FIG. 9.
Figure 9:
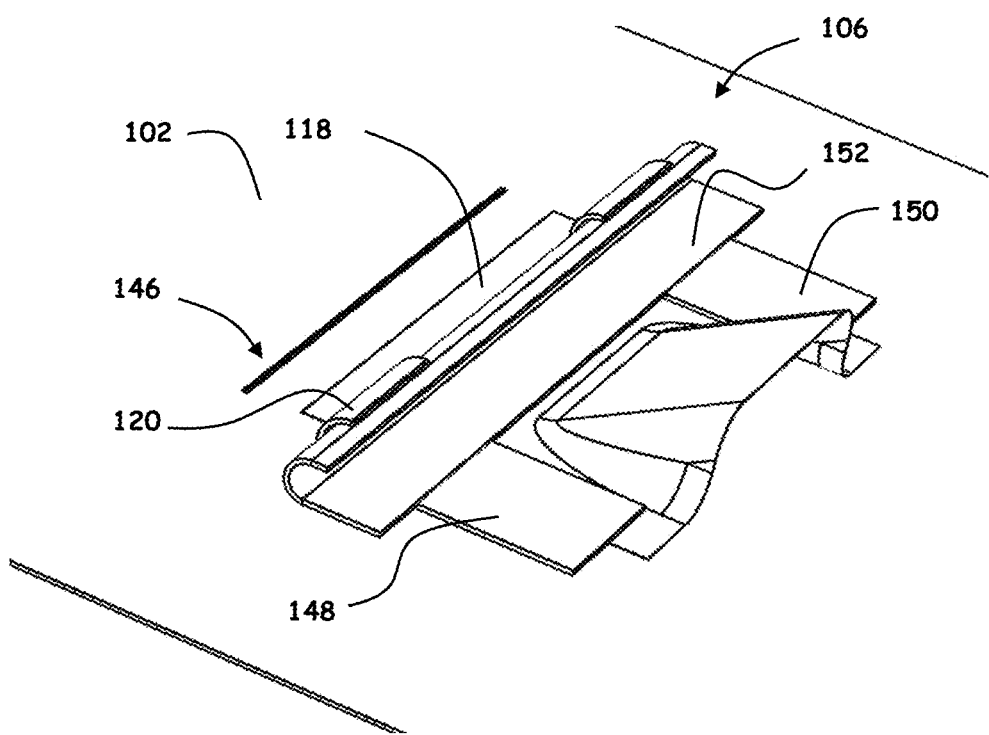
FIG. 9 is a perspective view of an embodiment of a flashing assembly showing the tape positioned to allow flashing to be inserted into an opening in the surface.
Figure 10:
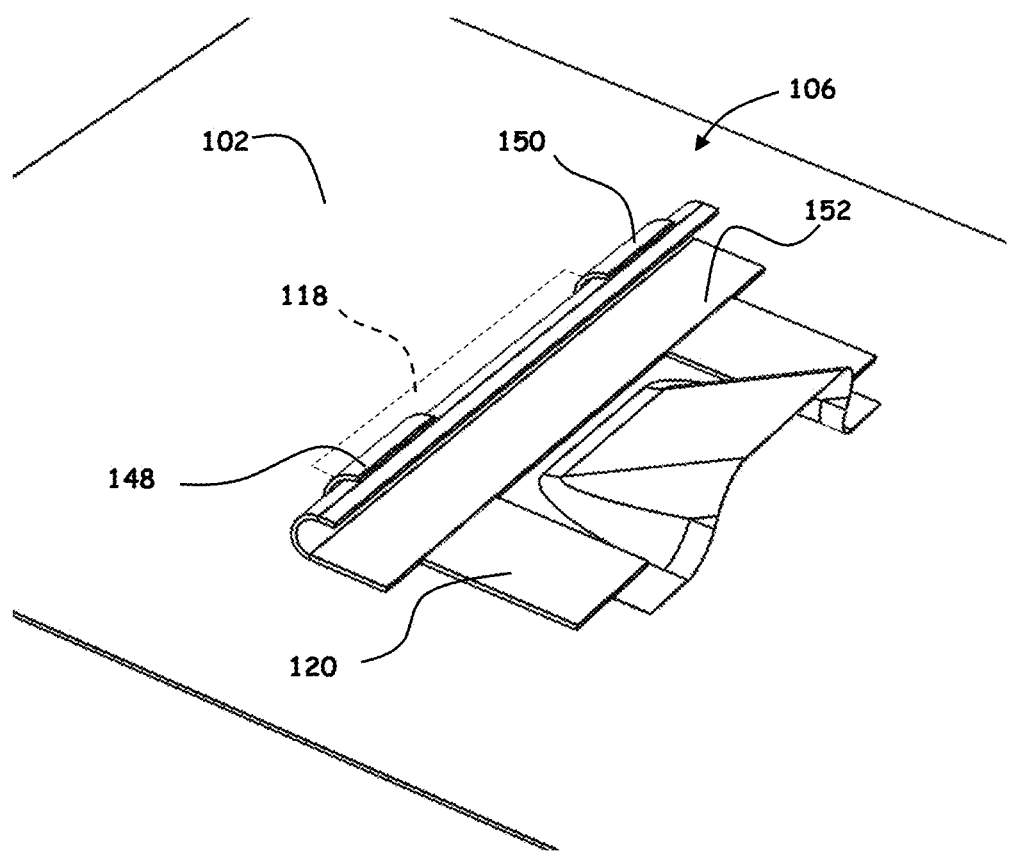
FIG. 10 is a perspective view of the flashing assembly shown in FIG. 9 showing the flashing positioned in the opening in the surface.

FIGS. 8-10 show the flashing assembly 106 being attached to the surface 102. In this embodiment, a portion of the flashing assembly 106 may be positioned within an opening or slit 146 in the surface 102. FIG. 8 is a schematic illustration of the surface 102 being prepared to receive the flashing assembly 106. Specifically, the slit 146 is formed using a tool 147. In other embodiments, the slit 146 may be formed in any manner and not necessarily using the tool 147. For example, in some embodiments, the slit 146 may be located at a joint between sections of the surface 102 and the overlapping sheets of the sections may be pulled apart to receive the flashing assembly 106 in the slit 146. In other embodiments, the surface 102 may be prepared in any manner that enables the flashing assembly 106 to function as described. For example, in some embodiments, the surface 102 is cleaned and prepared for attaching to an adhesive.

As shown in FIGS. 9 and 10, the tape 120 may be positioned to facilitate the flashing assembly 106 being inserted into the slit 146. When inserted into the slit 146, the flashing 118 extends at least partially underneath the surface 102. With the flashing 118 in position as shown in FIG. 10, the tape 120 may be positioned over the surface 102 and the second attachment area 138 attached to the surface. Accordingly, the flashing assembly 106 is in the second configuration and at least a portion of the surface 102 is positioned between the flashing 118 and the tape 120. In the second configuration shown in FIG. 10, the tape 120 provides a watertight seal between the surface 102 and the flashing assembly 106. In addition, the tape 120 seals the slit 146 and provides an overlap on the surface 102 and the flashing 118. In other embodiments, the flashing assembly 106 may be installed in any manner that enables the flashing assembly to function as described.

Figure 11:
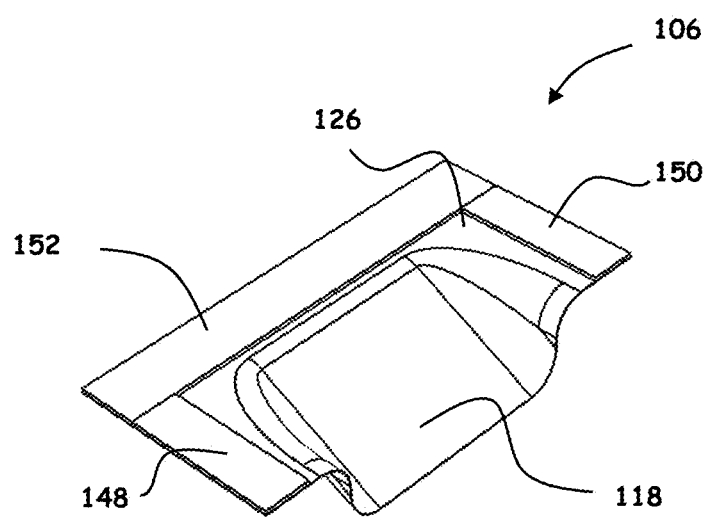
FIG. 11 is a perspective view of the underside of an embodiment of a flashing assembly for mounting a PV assembly on a surface including non-overlapping tape.

In some embodiments, the flashing assembly 106 may include different configurations of the tape 120. For example, FIG. 11 shows the tape 120 in a non-overlapping configuration. The tape 120 includes a first strip 148, a second strip 150, and a third strip 152. The first strip 148 and the second strip 150 extend along opposite ends of the edge 132 of the flashing 118. The third strip 152 extends along the edge 132 between the strips 148, 150. Accordingly, the third strip 152 abuts and forms joints with the strips 148, 150. Accordingly, the strips 148, 150, 152 may reduce the material required to assemble the flashing assembly 106. In some embodiments, the tape 120 includes a single, continuous strip 148. In other embodiments, the tape 120 may include any strips 148, 150, 152 that enable the tape to function as described.

In addition, the strips 148, 150, 152 are positioned on the bottom surface 126 of the flashing 118. The strips 148, 150, 152 are double sided, i.e., the first attachment area 136 and the second attachment area 138 are on opposite sides of the tape. Accordingly, the tape 120 is positioned between the flashing 118 and the surface 102 (shown in FIG. 1) when the flashing assembly is secured to the surface. In this embodiment, the tape 120 does not extend beyond the edges 132 of the flashing 118.

Figure 12:
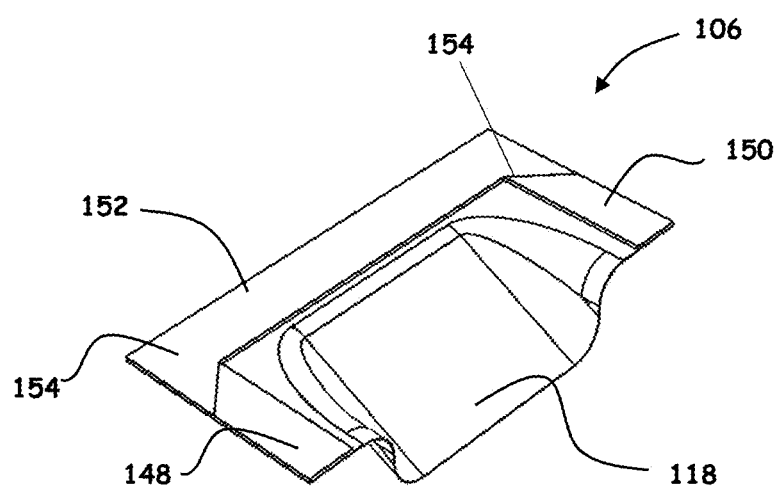
FIG. 12 is a perspective view of the underside of an embodiment of a flashing assembly including tape having angled cuts.

FIGS. 12 and 13 show the tape 120 forming angled joints 154. The strips 148, 150, 152 are cut along corresponding angles such that the strips abut and form the angled joints 154. The angle of the joints 154 relative to the direction of liquid flow 144 increases the seal of the flashing assembly 106. For example, the flashing assembly 106 may be positioned such that the joints 154 form an upslope path for the liquid flow 144. In addition, the tape 120 forms a tortuous path for the liquid to inhibit liquid ingress through the flashing assembly 106. In other embodiments, the tape 120 may be any shape that enables the flashing assembly 106 to function as described.

In the embodiment shown in FIGS. 14 and 15, the tape 120 is shaped to correspond to the shape of the edge 132 of the flashing 118. Specifically, the tape 120 includes angled corners that correspond to angled corners of the flashing 118. The tape 120 is positioned on the bottom surface 126 of the flashing 118 and extends along but not beyond edges 132 of the flashing. In other embodiments, the tape 120 may have any shape that enables the flashing assembly 106 to function as described. For example, in some embodiments, the tape 120 may include curves. The shape of the tape 120 may allow the tape to include a single, continuous piece extending along the edge 132 of the flashing 118. In addition, the shape of the tape 120 can inhibit water penetration at the joints of the tape.

In addition, in this embodiment, the edge 132 includes linear segments oriented oblique to each other. Accordingly, the flashing 118 includes angled or chamfered corners. In other embodiments, the flashing 118 and/or the tape 120 may have any shape that enables the flashing assembly 106 to function as described. For example, the flashing 118 may include curves.

Figure 16:
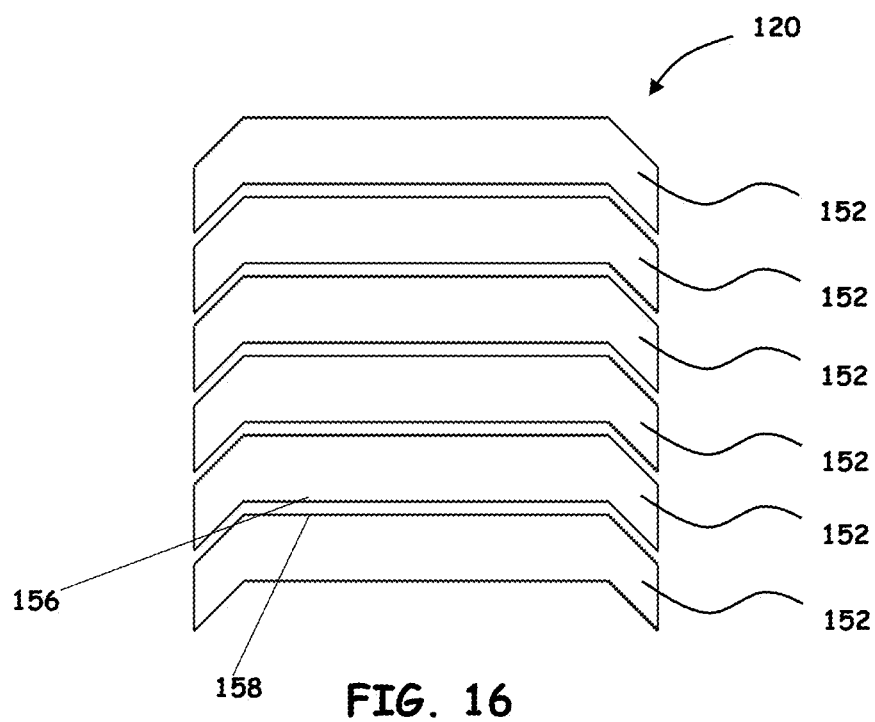
FIG. 16 is a top view of strips of tape for use with the flashing assembly shown in FIGS. 14 and 15.

As shown in FIG. 16, the shape of the tape 120 may facilitate the tape 120 being cut to correspond to the shape of the flashing 118 (shown in FIG. 15) with reduced waste. For example, the third strips 152 may be cut such that an inner edge 156 and an outer edge 158 of the strips are parallel. Accordingly, a single cut may be made to form the inner edge 156 of a strip 152 and the outer edge 158 of an adjacent strip 152. In other embodiments, the tape 120 may be cut in any manner that enables the tape to function as described.

Figure 17:
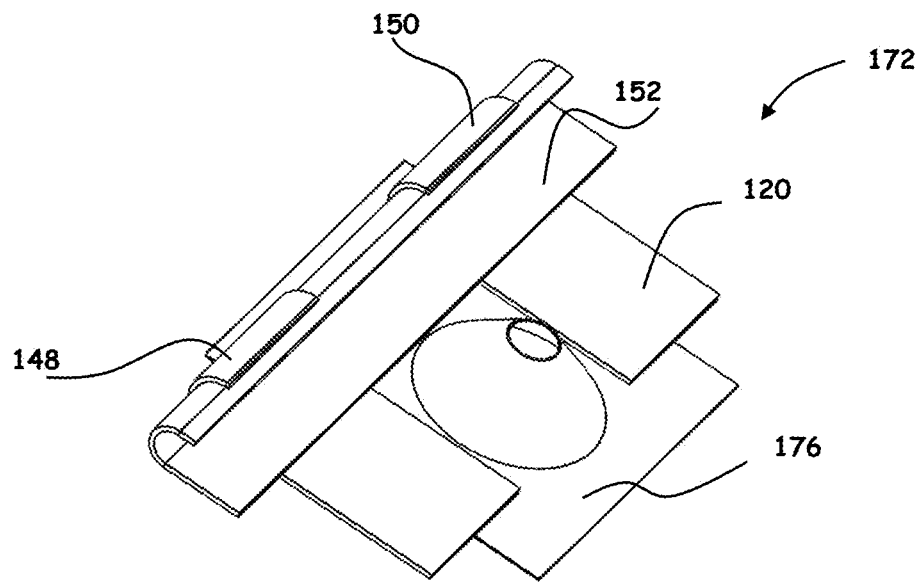
FIG. 17 is a perspective view of an embodiment of a flashing assembly including tape in a first configuration and positioned to facilitate positioning flashing relative to the surface and to the surface preparations shown in FIG. 8.
Figure 22:
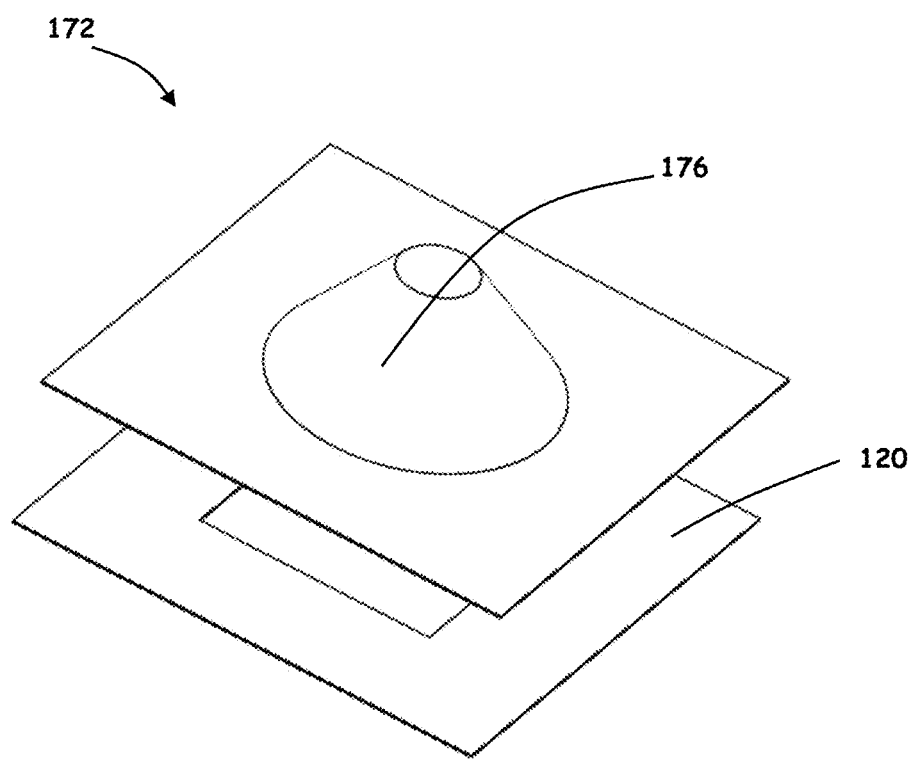
FIG. 22 is a partially exploded perspective view of an embodiment of a flashing assembly including tape on a bottom surface.
Figure 23:
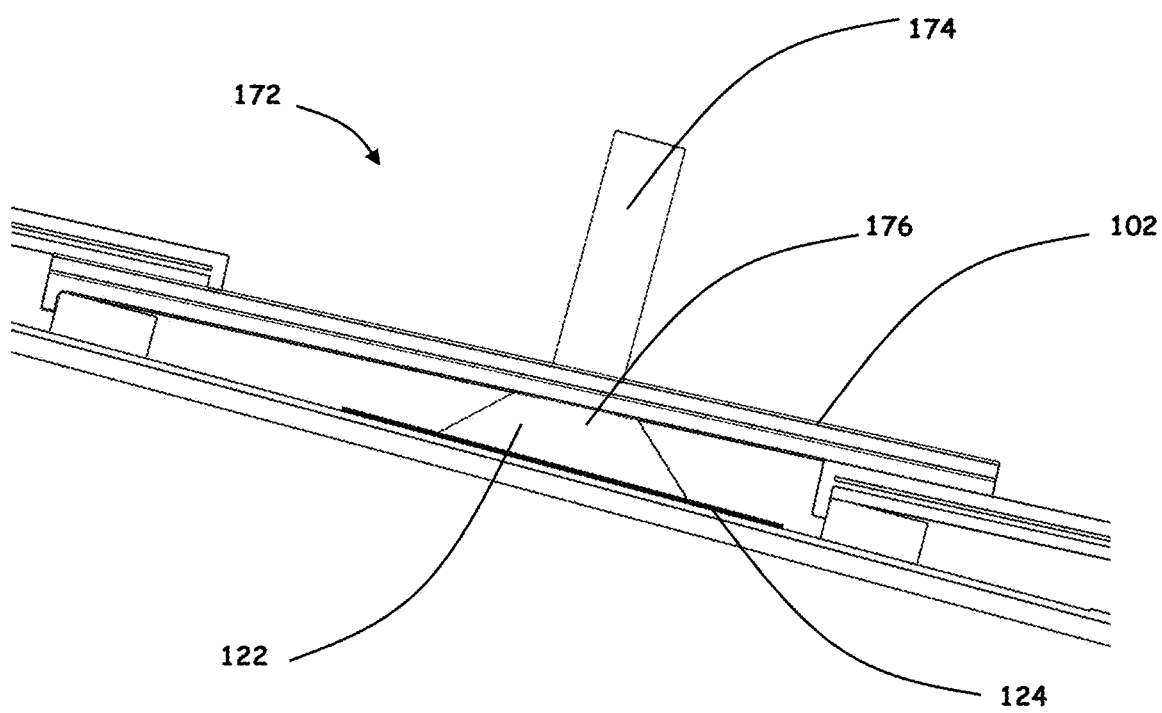
FIG. 23 is a side view of a system for mounting a PV module on a surface.
Figure 24:
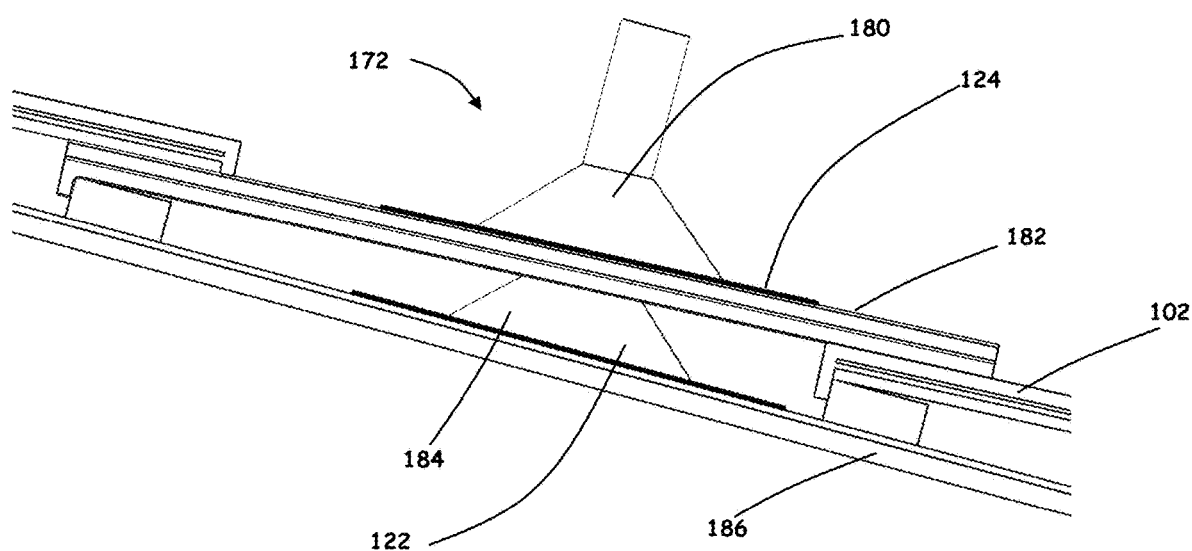
FIG. 24 is a side view of a system for mounting a PV module on a surface including two flashing assemblies.
Figure 25:
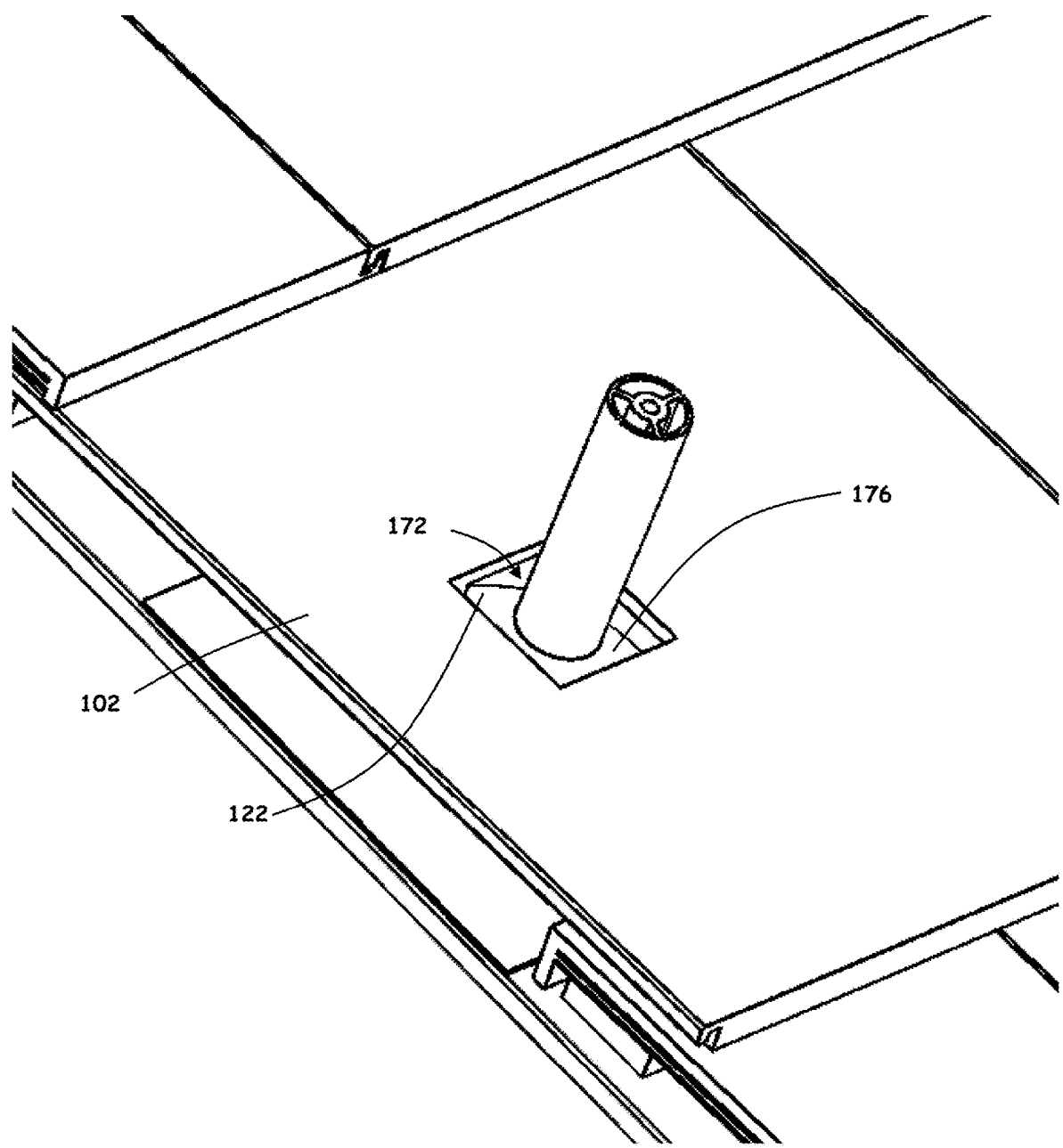
FIG. 25 is a perspective view of the system shown in FIG. 23.
Figure 26:
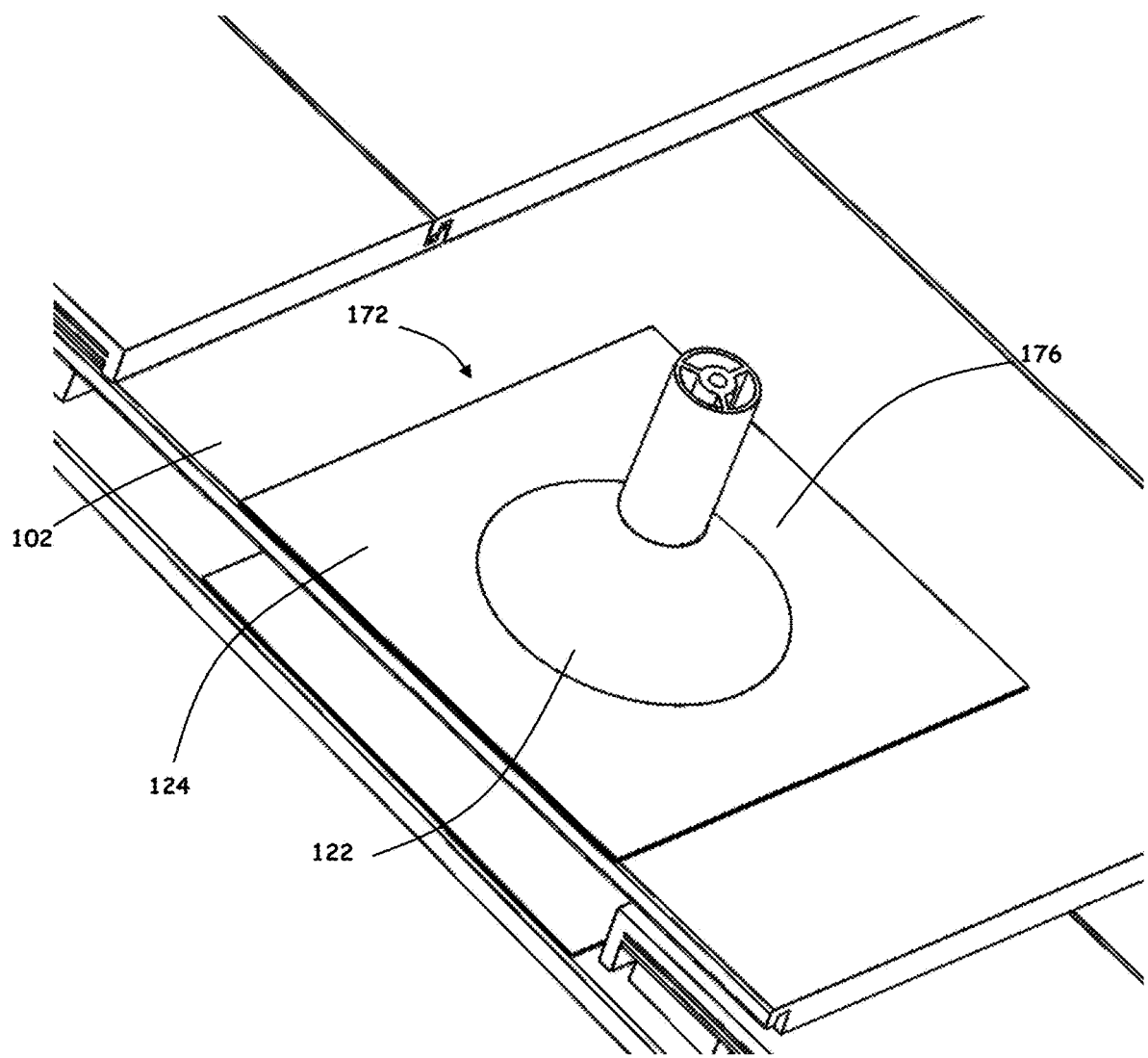
FIG. 26 is a perspective view of the system shown in FIG. 24.
Figure 27:
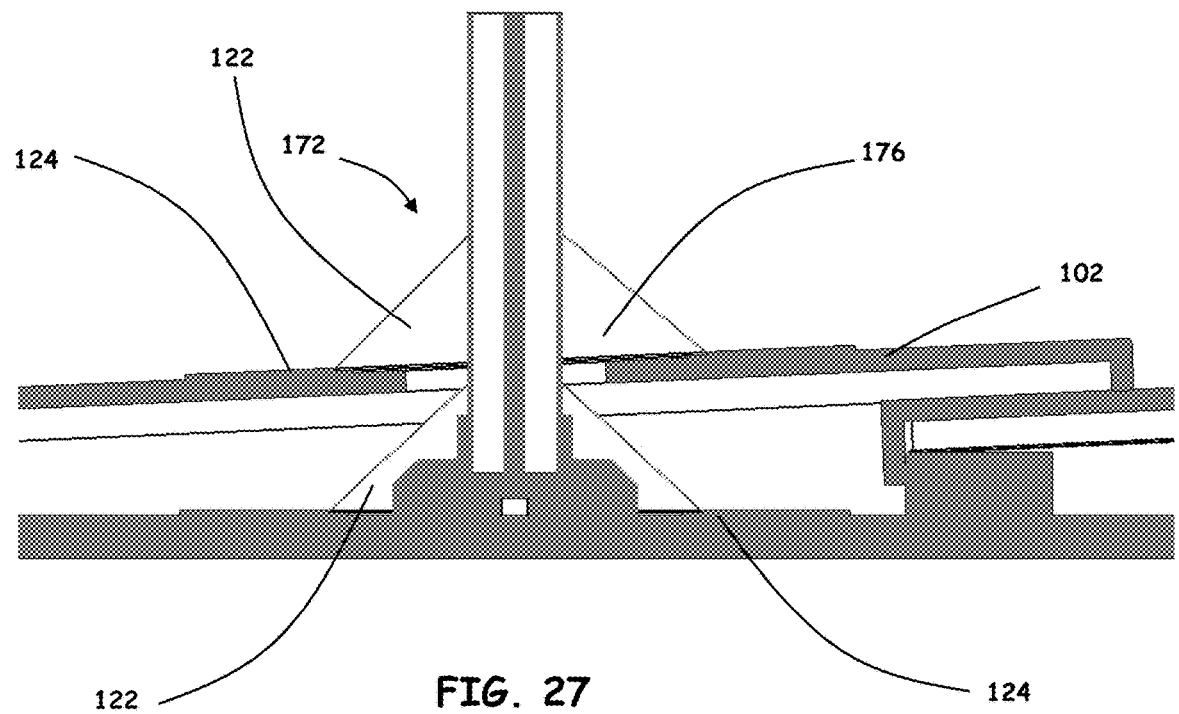
FIG. 27 is a sectional view of the system shown in FIGS. 24 and 26.

FIG. 17 is a perspective view of an embodiment of a flashing assembly 172 for a stanchion 174 (shown in FIG. 23). The flashing assembly 172 is similar to the flashing assembly 106 (shown in FIG. 2) except the flashing 176 of the flashing assembly 172 is configured to extend around the stanchion 174 (shown in FIG. 22). The tape 120 may be positionable to facilitate positioning the flashing assembly 172 relative to the surface 102. For example, as shown in FIG. 17, a portion of the tape 120 may be displaced to facilitate positioning the flashing 176 along the surface 102 as in FIG. 8. In other embodiments, the tape 120 may be positionable in any manner that enables the tape to function as described.

In this embodiment, the second attachment area 138 overlaps the flashing 118 and a portion of the second release sheet 142 extends between the second attachment area and the flashing. Accordingly, the tape 120 may be positioned to expose a portion of the flashing 118 and facilitate the flashing being positioned relative to the surface 102 (shown in FIG. 9) and the preparations (e.g., slit 146 (shown in FIG. 9)) in the surface.

Figure 18:
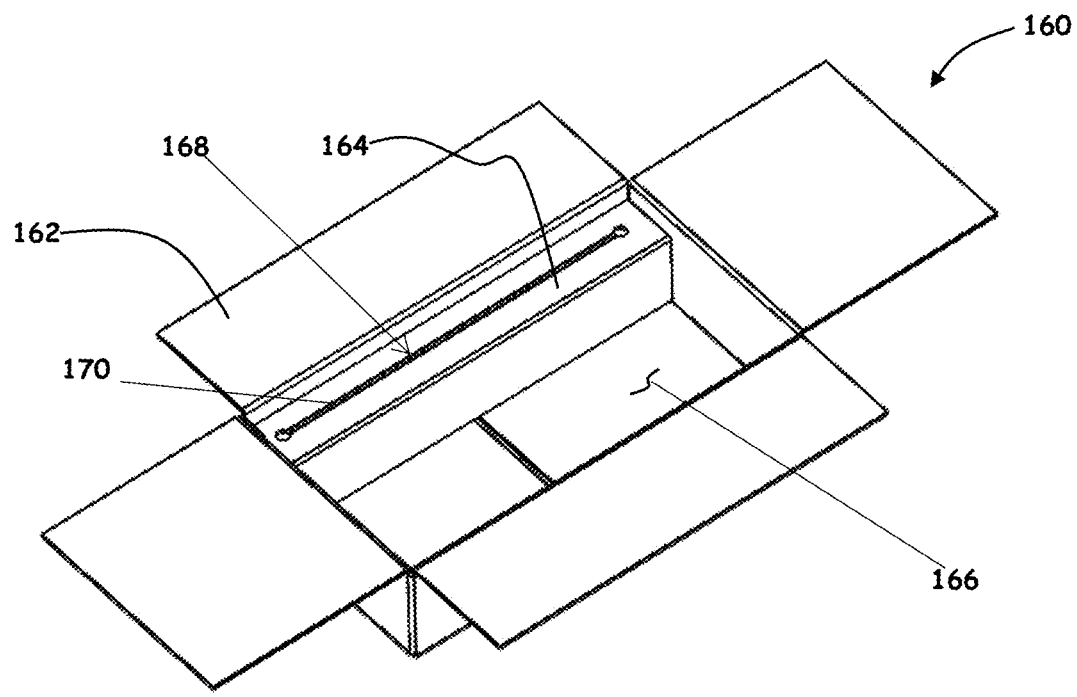
FIG. 18 is a perspective view of a package for the flashing assemblies shown in FIGS. 2-7 and 9-17.
Figure 19:
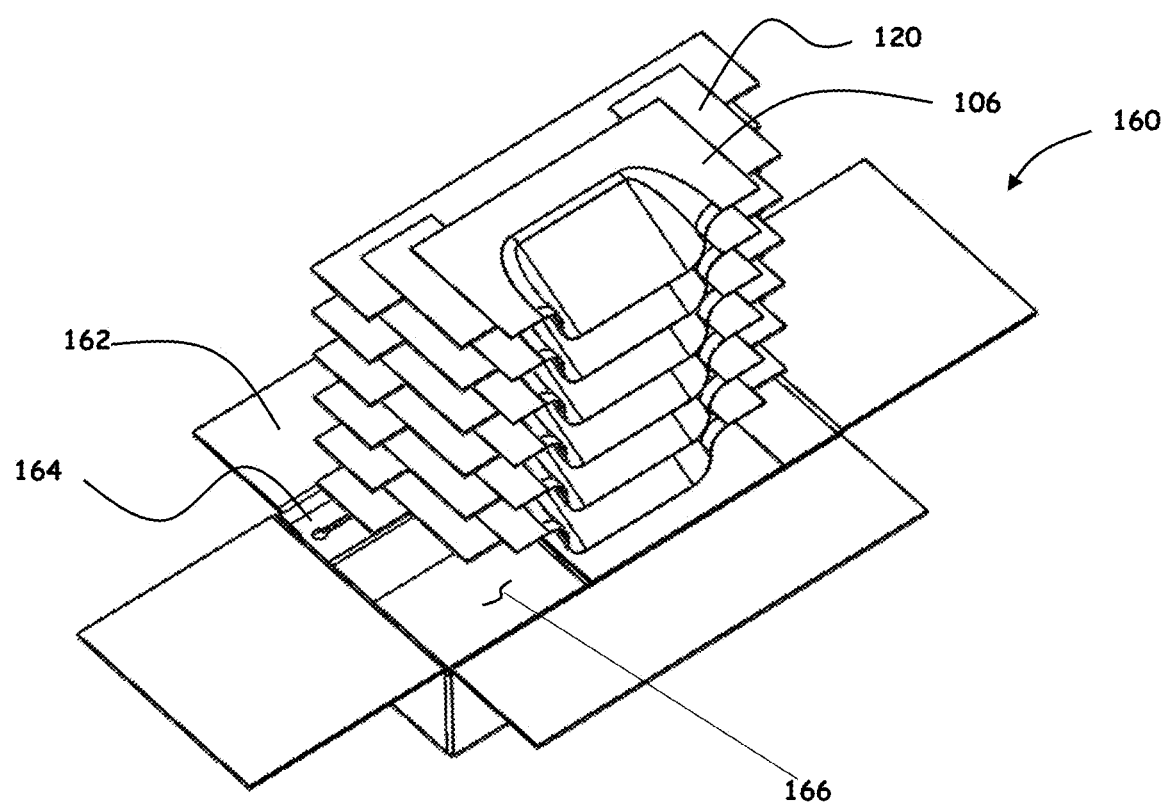
FIG. 19 is a perspective view of the flashing assemblies being positioned in the package shown in FIG. 18.
Figure 20:
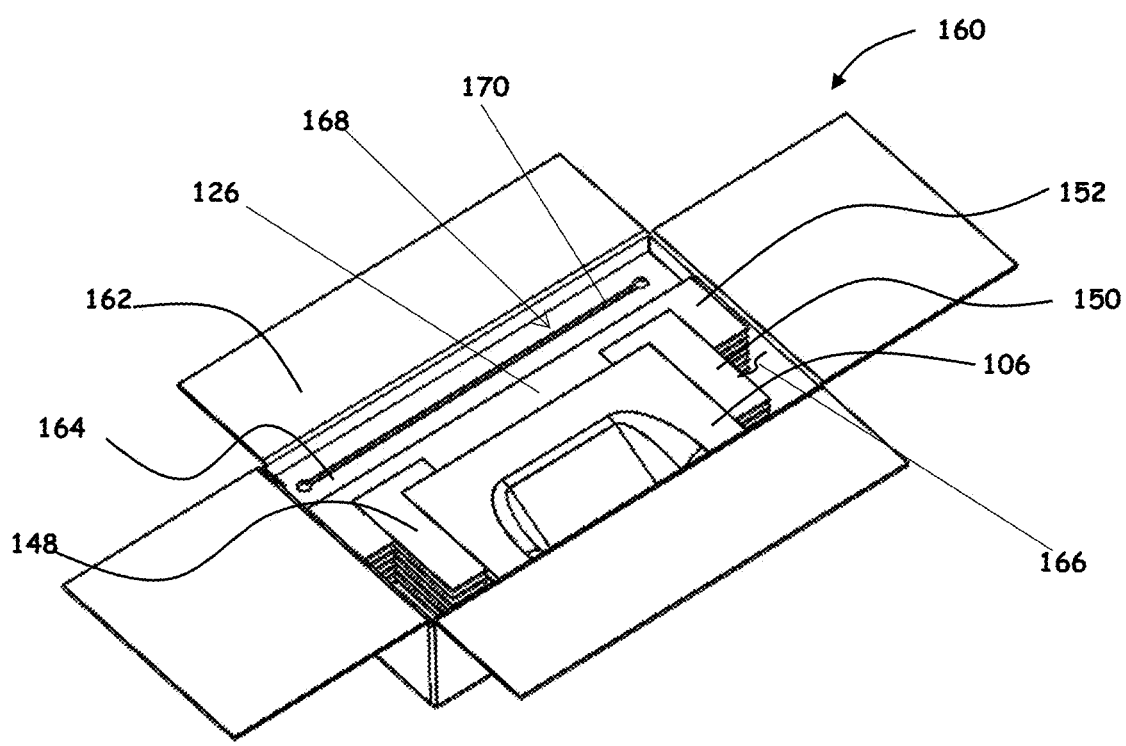
FIG. 20 is a perspective view of a stack of the flashing assemblies positioned in the package shown in FIG. 18.

FIG. 18 is a perspective view of a package 160 for use with the flashing assembly 106. FIG. 19 is a perspective view of the flashing assembly 106 being positioned in the package 160. FIG. 20 is a perspective view of stacked flashing assemblies 106 in the package 160. The package 160 includes a container 162 and a receptacle 164. In this embodiment, the container 162 is rectangular cuboid. In other embodiments, the container 162 may have any shape that enables the package to function as described. For example, in some embodiments, the package 160 may be cylindrical, spherical, cuboid, prismatic, and/or any other shape.

The container 162 defines an interior space 166 that receives the flashing assembly 106 in a first configuration. Specifically, the container 162 is sized to receive the flashing 118 and the tape 120 attached to the flashing. Moreover, the container 162 is sized to receive a plurality of the flashing assemblies 106. For example, as shown in FIGS. 19 and 20, the flashing assemblies 106 may be arranged in a stacked configuration and positioned within the interior space 166. The second release sheets 142 (shown in FIG. 6) on the flashing assemblies 106 in the first configuration allow the flashing assemblies to be stacked without the second attachment areas (shown in FIG. 6) attaching to adjacent flashing assemblies. In some embodiments, the flashing assemblies 106 may be positioned such that the release sheets 140, 142 (shown in FIGS. 3 and 6) are accessible and may be removed while the respective flashing assembly is positioned in the interior space 166. For example, as shown in FIG. 20, the flashing assemblies 106 may be positioned upside down such that the bottom surface 126 and the second release sheets 142 (shown in FIG. 6) are accessible. In other embodiments, the flashing assemblies 106 may be positioned in the container 162 in any manner that enables the package 160 to function as described.

In this embodiment, the receptacle 164 is positioned within the interior space 166 and attached to the container 162. The receptacle 164 defines an interior space 168 for receiving the release sheets 140, 142 (shown in FIGS. 3 and 6) when the release sheets are removed from the tape 120. In particular, the receptacle 164 receives the second release sheets 142 (shown in FIG. 6) when the second release sheets are removed from the second attachment areas 138 (shown in FIG. 6) during installation at an installation site. In other embodiments, the receptacle 164 may receive any components that enable the package 160 to function as described. For example, in some embodiments, the receptacle may receive discarded portions of the tape 120 and/or flashing 118.

The receptacle 164 is a rectangular cuboid and includes an elongated opening or slot 170 providing access to the interior space 168. The slot 170 has a shape and size that allows the release sheets 140, 142 (shown in FIGS. 3 and 6) to be positioned within the interior space 168 and inhibits the release sheets exiting the interior space. The interior space 168 is closed from the exterior other than the slot 170. In other embodiments, the receptacle 164 may have any configuration that enables the package 160 to function as described. For example, in some embodiments, the receptacle 164 may include more than one opening for receiving the release sheets. In further embodiments, the receptacle 164 may be cylindrical, spherical, cuboid, prismatic, and/or any other shape.

The package 160 facilitates transporting and/or storing the flashing assemblies 106. In addition, the package 160 facilitates the management of material and debris during installation of the flashing assemblies 106. For example, the receptacle 164 allows for the collection of release sheets 140, 142 that otherwise could pose safety hazards, e.g., a slip and fall hazard, on a surface such as a roof. Also, the package 160 reduces the time required on an installation site by reducing the time required to clean the installation site. Moreover, the package 160 facilitates the appearance of a clean and organized installation site.

Figure 21:
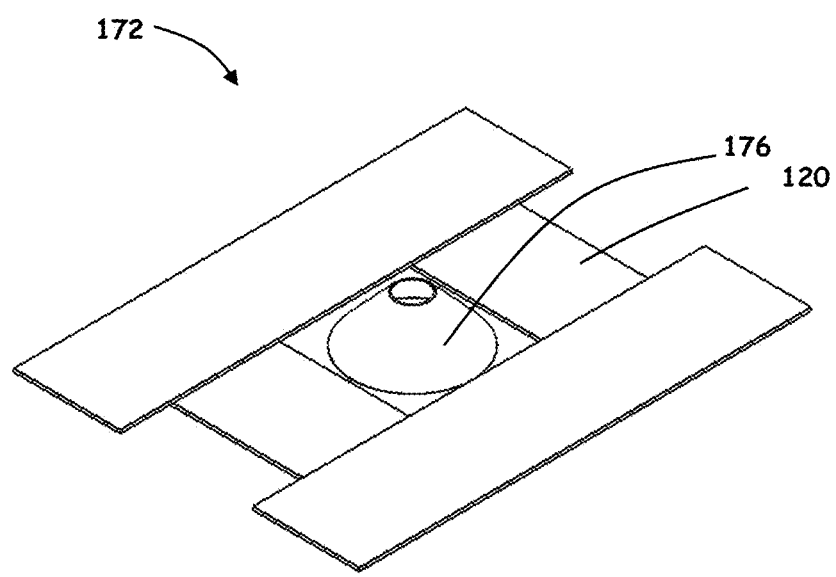
FIG. 21 is a perspective view of an embodiment of a flashing assembly for use with a stanchion.

FIGS. 21 and 22 are perspective views of embodiments of a flashing assembly 172 for a stanchion 174 (shown in FIG. 23). The flashing assembly 172 is similar to the flashing assembly 106 (shown in FIG. 2) except the flashing 176 of the flashing assembly 172 is configured to extend around the stanchion 174 (shown in FIG. 23). In the embodiment shown in FIG. 21, the tape 120 includes overlapping strips. In the embodiment shown in FIG. 22, the tape 120 includes a single continuous piece extending between the flashing 176 and the surface 102.

FIGS. 23-27 show the flashing assembly 172 installed on a roof. The first portion 122 may extend above an upper surface of the roof (e.g., roof tiles) when the second portion 124 is coupled to a lower surface (e.g., an underlayment). Accordingly, the flashing 176 may direct fluid away from the base of the stanchion 174.

In some embodiments, a plurality of flashing assemblies 172 are used to flash a single stanchion 174. For example, in the embodiment shown in FIG. 24, an upper flashing assembly 180 is coupled to an upper surface 182 and a lower flashing assembly 184 is coupled to a lower surface 186. In other embodiments, any number of flashing assemblies 172 may be used with the stanchion 174 that enable the stanchion to function as described.

Figure 28:
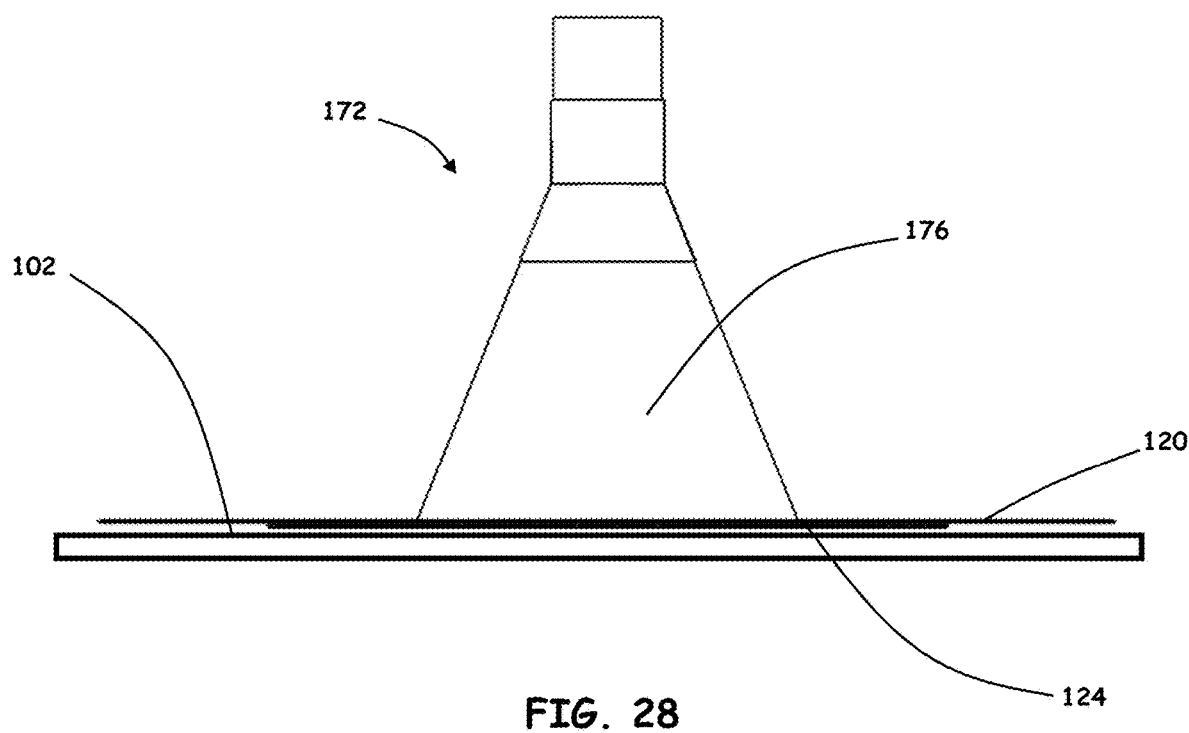
FIG. 28 is a sectional view of a system including a stanchion and a flashing assembly.

FIG. 28 is a sectional view of a flashing assembly 172 and a stanchion 174. The stanchion 174 may be secured to the surface 102. During installation, the flashing assembly 172 is positioned over the stanchion 174. The flashing assembly 172 may be in the first configuration such that the tape 120 is attached to the flashing 176 and allows the flashing 176 to be positioned relative to the stanchion 174. The second release sheets 142 (shown in FIG. 6) may then be removed from the flashing assembly 172 and the tape 120 may be attached to the surface 102. In the second configuration, the flashing assembly 172 provides a watertight seal on the surface 102. The tape 120 may include one or more strips that provide a continuous barrier to water. The stanchion 174 may then be connected to a support system for the PV module 101 (shown in FIG. 1). Accordingly, the flashing assembly 172 simplifies the mounting of the PV modules and provides a watertight seal for any penetrations.

Figure 29:
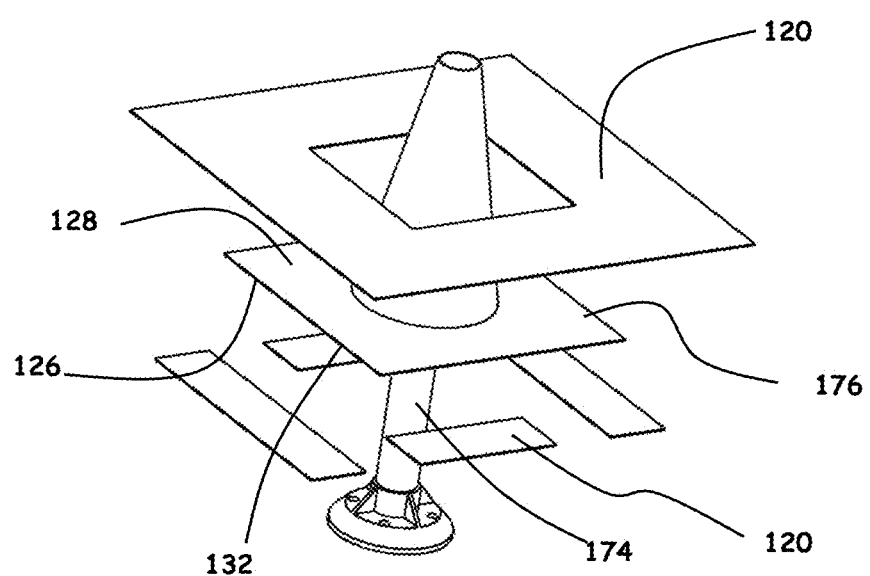
FIG. 29 is an exploded view of an embodiment of a flashing assembly.

FIG. 29 is an exploded perspective view of an embodiment of the flashing assembly 172 and the stanchion 174. In this embodiment, the tape 120 is positioned on the bottom surface 126 and the top surface 128 of the flashing 176. Accordingly, the layers of tape 120 may provide a better seal and facilitate attaching the flashing assembly 172 to the surface 102. In addition, the tape 120 may be positioned between the stanchion 174 and the surface 102 and seal any penetrations used to secure the stanchion.

Figure 38:
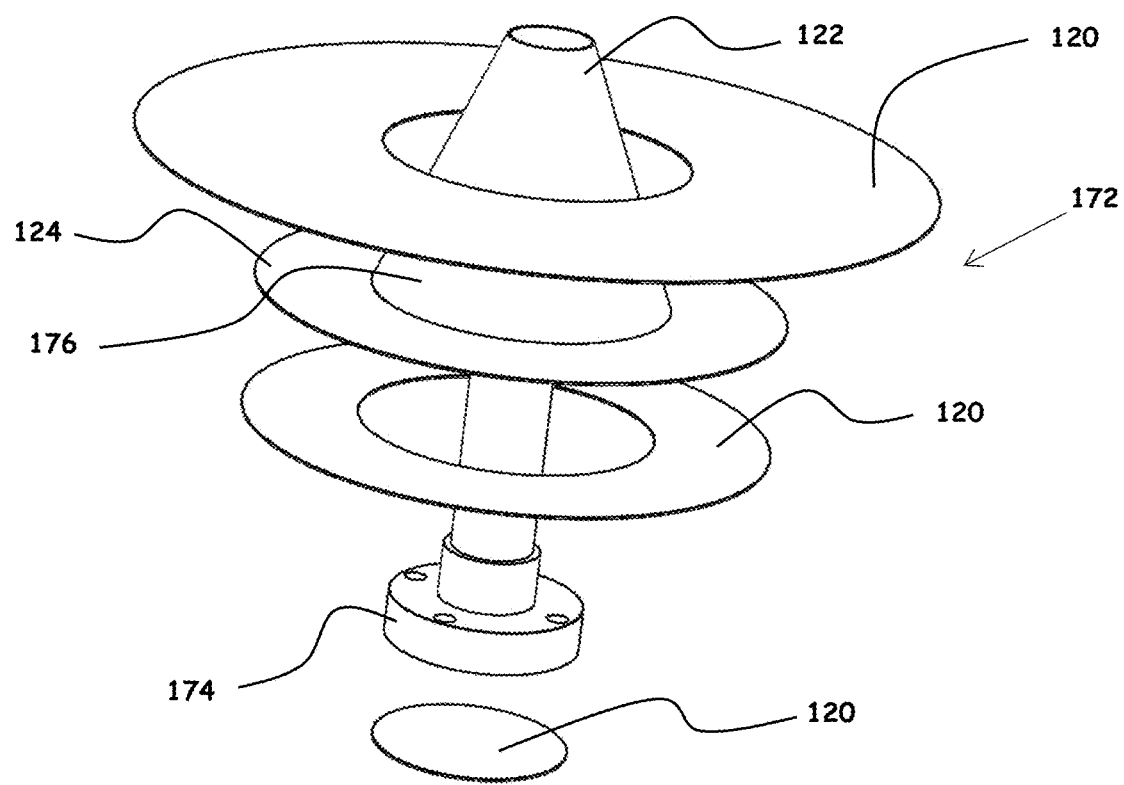
FIG. 38 is an exploded view of the flashing assembly shown in FIG. 37.

The tape 120 on the top surface 128 extends along and beyond the edges 132 of the flashing 176 on all sides. Accordingly, the tape 120 provides a watertight seal around the entire perimeter of the flashing assembly 172. As a result, the flashing assembly 172 may be suitable for a low-slope or flat surface 102 where liquid may flow in any direction. In other embodiments, the flashing assembly 172 may have any configuration that enables the flashing assembly to function as described. For example, in some embodiments, the tape 120 includes a single strip that extends continuously around the entire perimeter of the flashing 176 as shown in FIG. 38.

Figure 36:
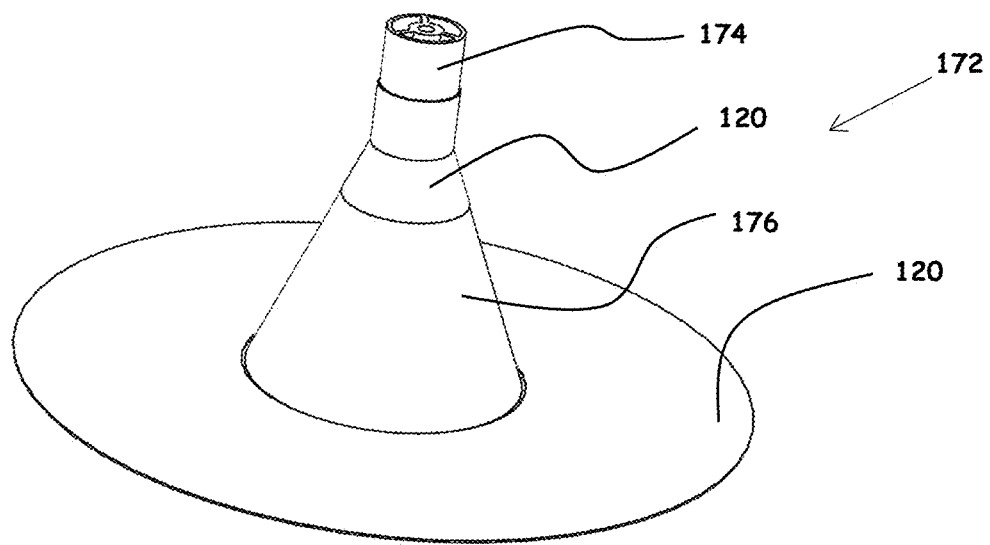
FIG. 36 is a perspective view of an embodiment of a flashing assembly including tape extending across an interface of a stanchion and flashing.
Figure 37:
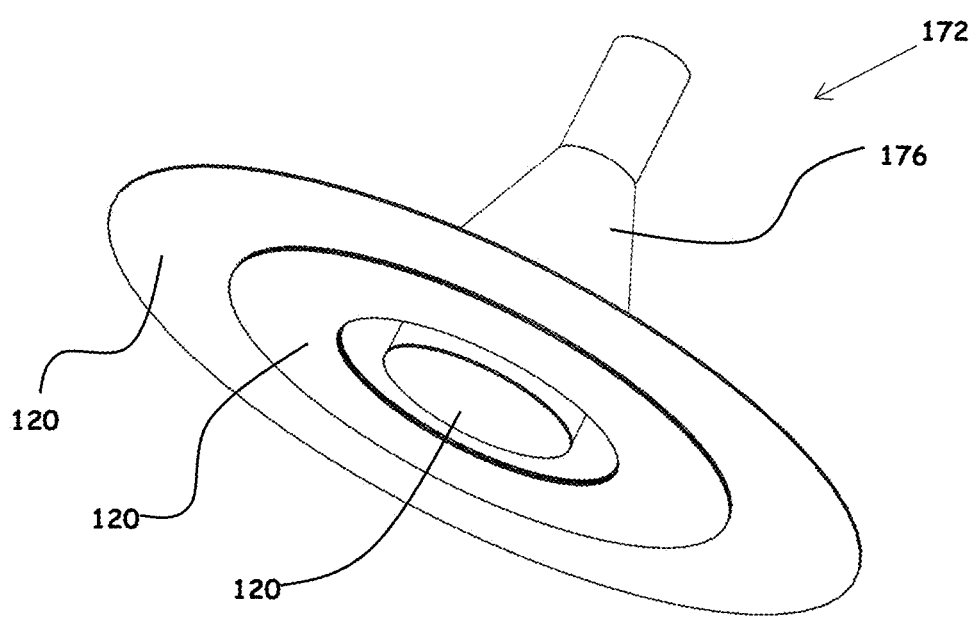
FIG. 37 is a perspective view of an embodiment of a flashing assembly including tape attached to a stanchion.

In addition, as shown in FIG. 36, the tape 120 may extend across an interface between the flashing 176 and the post stanchion 174. Accordingly, the tape 120 may be located on at least four different interfaces to provide watertight seals and prevent liquid penetrating the flashing assembly 106. For example, the flashing assembly 172 may include a first tape 120 extending along the interface of the post stanchion 174 and the flashing 176, a second tape 120 extending along a top surface of the flashing and the surface 102 (shown in FIG. 28), a third tape 120 extending between a bottom surface 126 of the flashing and the surface, and a fourth tape 120 extending between a bottom surface of the post stanchion and the surface. In other embodiments, the flashing assembly 172 may include any tape 120 that enables the flashing assembly to function as described.

Figure 30:
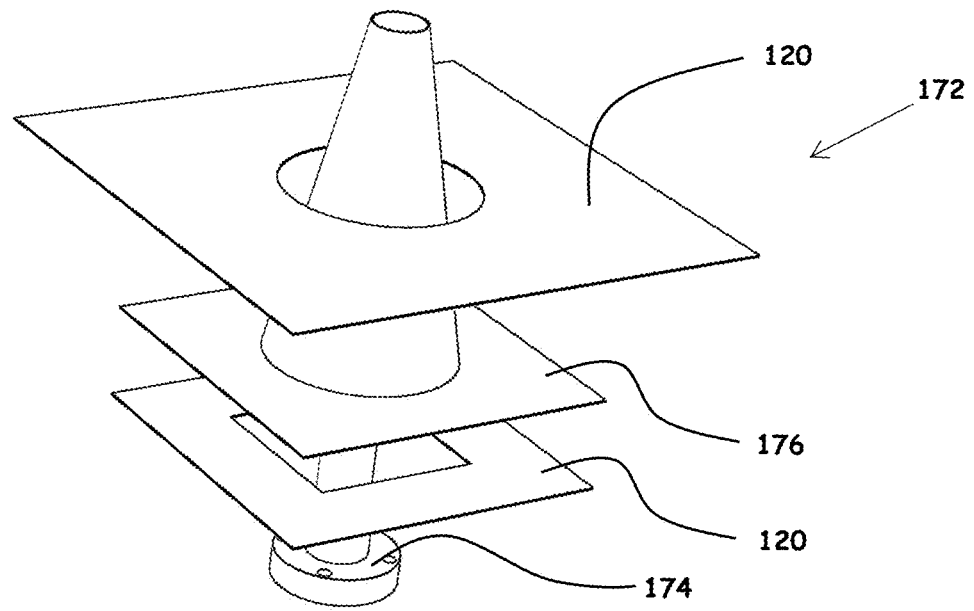
FIG. 30 is an exploded view of an embodiment of a flashing assembly including tape having an opening shaped to correspond to flashing, the tape including a continuous strip on the underside.
Figure 31:
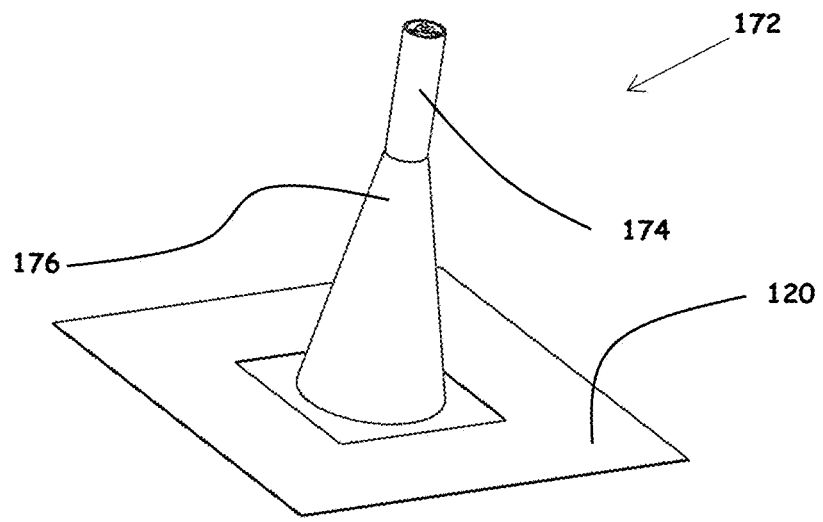
FIG. 31 is a perspective view of the flashing assembly shown in FIG. 29.
Figure 32:
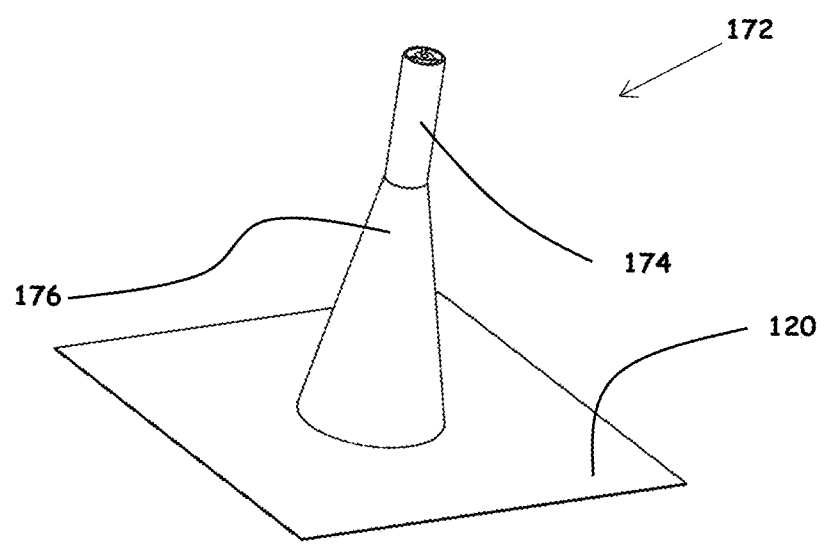
FIG. 32 is a perspective view of an embodiment of the flashing assembly shown in FIG. 30.

In the embodiment shown in FIGS. 29 and 31, the tape 120 is square and defines a square opening to receive the flashing 176. In other embodiments, the tape 120 may be any shape that enables the flashing assembly 172 to function as described. For example, in an embodiment shown in FIGS. 30 and 33, the tape 120 defines a circular opening for the flashing 176. In embodiments shown in FIGS. 35-38, the tape 120 is circular and defines a circular opening. In further embodiments, the tape 120 may be circular, rectangular, triangular, polygonal, conical, cylindrical, and/or any other shape.

Figure 33:
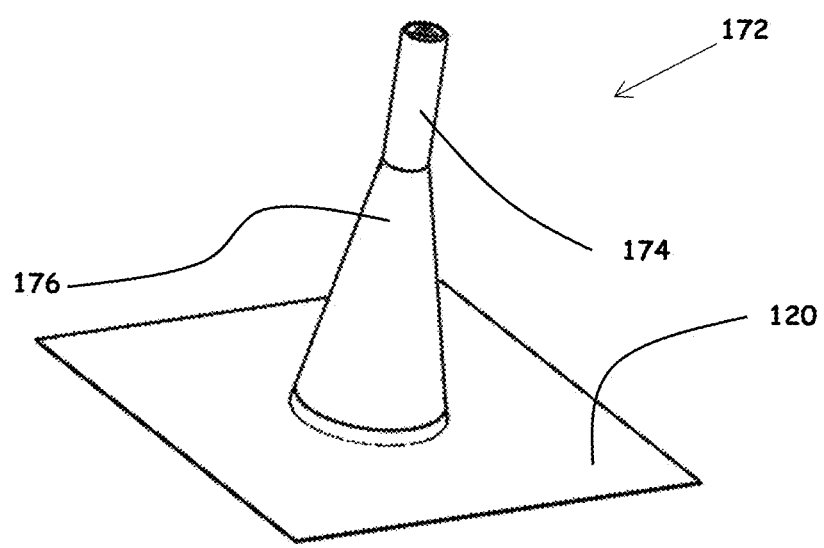
FIG. 33 is a perspective view of an embodiment of a flashing assembly including tape extending along a first portion of flashing.

In the embodiment shown in FIG. 33, the tape 120 defines a circular opening that has a diameter less than a diameter of the circular base of the first portion 122. As a result, the tape 120 extends at least partially along the first portion 122 and may seal an interface between the second portion 124 and the first portion 122. In other embodiments, the tape 120 may extend along any portion of the flashing 176 that enables the tape 120 to function as described. For example, in some embodiments, the tape 120 may include any number of strips, including one.

Figure 34:
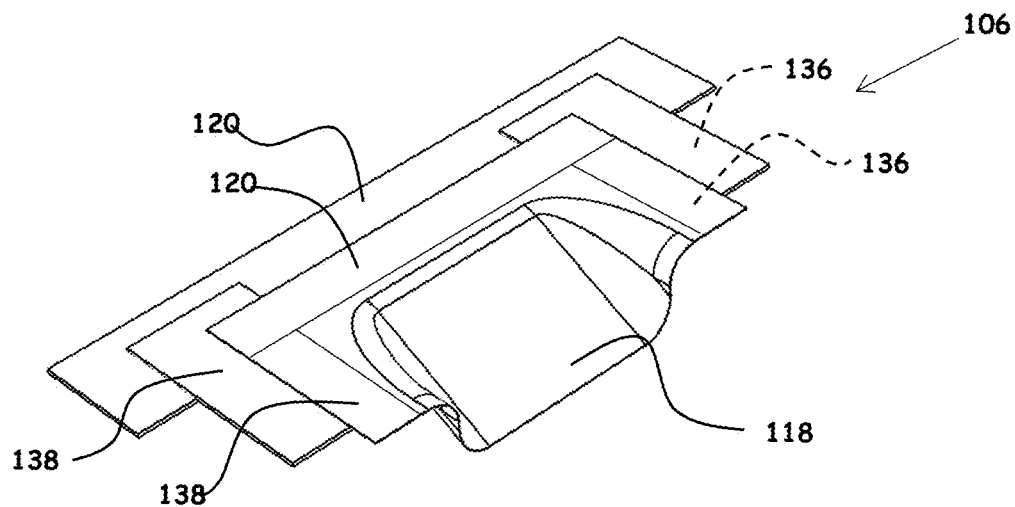
FIG. 34 is a perspective view of an embodiment of a flashing assembly including layers of tape including a layer overlapping the surface and a layer positioned between the flashing assembly and the surface.
Figure 35:
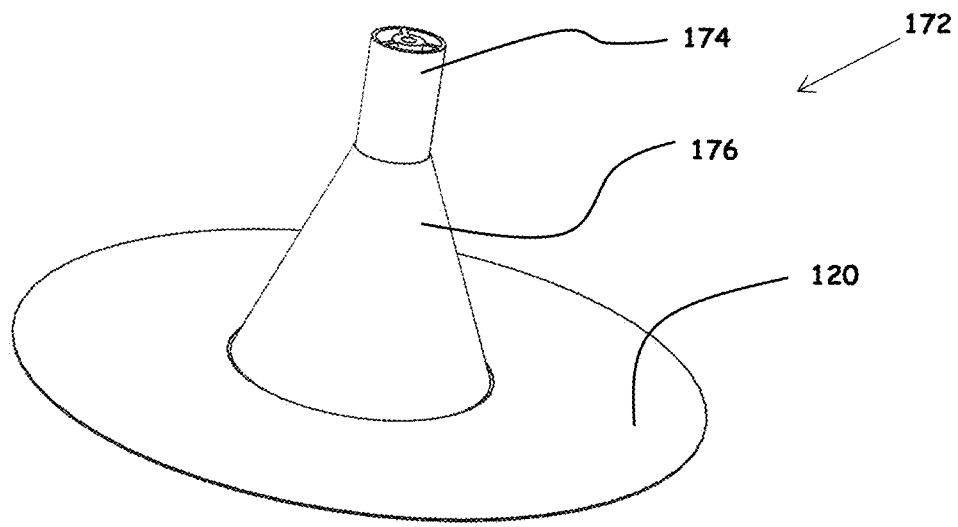
FIG. 35 is a perspective view of an embodiment of a stanchion and a flashing assembly having a circular shape.

FIG. 34 is a perspective view of an underside of the flashing assembly 106 including layers of tape 120. Specifically, a first layer of tape 120 is positioned on the top surface 128 of the flashing 118 and a second layer of tape is positioned on the bottom surface 126 of the flashing. The first layer of tape 120 may be single sided tape and the second layer of tape may be double-sided tape. Accordingly, the layers of the tape 120 may provide a watertight seal and a more secure attachment between the flashing assembly 106 and the surface 102 than a single layer of the tape. In other embodiments, the flashing assembly 106 may include any layers of tape 120 that enable the flashing assembly to function as described.

In the embodiments shown in FIGS. 29-33 and 35-38, a single strip of tape 120 extends continuously around the entire perimeter of the flashing 176. Accordingly, the flashing assembly 172 forms a seamless seal along the surface 102 (shown in FIG. 28) and around the stanchion 174. As a result, the amount of seams are reduced and the risk of water ingress is lessened. Accordingly, the flashing assembly 172 may be suitable for a low-slope or flat surface where liquid may flow in several directions. In some embodiments, multiple layers and/or additional strips of tape 120 may be used in addition to the continuous tape 120 about the perimeter.

In addition, the shape of the flashing 176 and/or the tape 120 may simplify installation. For example, the circular shapes shown in FIGS. 35-38 do not require alignment with features (e.g., joints and corners) of the surface 102 (shown in FIG. 28) and/or with objects on the roof such as parapet and rooflines. Also, the shape of the flashing 176 and/or the tape 120 may provide a preferred appearance due to the symmetry and continuous edges of the installed flashing assembly 172.

In reference to FIG. 38, the tape 120 may have a shape that corresponds to the shape of the flashing 176. For example, in this embodiment, the flashing 176 includes a circular second portion 124 and a conical first portion 122. The first portion 122 has a circular base. The tape 120 is circular and defines a circular opening to receive the flashing 176. The tape 120 extends across the second portion 124 and about the first portion 122. Accordingly, the flashing assembly 172 seals around the entire perimeter of the stanchion 174. In other embodiments, the tape 120 and the flashing 176 may have any shapes that enable the flashing assembly 172 to function as described.

Embodiments of the methods and systems described achieve superior results compared to prior methods and systems. For example, the systems and methods described simplify the installation of PV modules on structures. More specifically, the embodiments reduce the labor, tools, and materials required for creating a water-resistant seal on a surface at the mount locations of the PV modules. In addition, the embodiments provide required materials for creating a seal as a single assembly and reduce the opportunities for incorrect installation. Moreover, the systems and methods described may provide a more robust and consistent seal at each mount location.

In addition, embodiments of the methods and systems described reduce installation errors such as (1) use of inappropriate tape that may result in failures and leaks, (2) waste due to cutting excess tape, (3) use of less than the amount of tape required to provide a proper seal, and (4) improper installation of the tape and/or sealing materials. Accordingly, the embodiments reduce the cost to install flashing and reduce the risk of failures and leaks of the flashing. Also, the embodiments may reduce the training and/or experience required to properly install the flashing and may allow for installation by hand or with the use of common workplace tools.

When introducing elements of the present invention or the embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A system for flashing a mount of a photovoltaic assembly on a surface, the system comprising:
  a flashing assembly comprising:
    flashing that extends across an interface of the mount and the surface when the mount is attached to the surface;
    a first tape attached to the flashing, the first tape including a top surface, a bottom surface, a first attachment area and a second attachment area, the bottom surface including an adhesive defining the first attachment area and the second attachment area, wherein the flashing assembly has a first configuration in which the first attachment area is attached to the flashing and the second attachment area is unattached, and a second configuration in which the first attachment area is attached to the flashing and the second attachment area is attached to the surface, the first tape being movable with the flashing as an assembly when the flashing assembly is in the first configuration; and a second tape attached to the flashing, wherein the first tape and the second tape overlap such that the second attachment area of the first tape is attached to the second tape when the flashing assembly is in the second configuration and unattached to the second tape when the flashing assembly is in the first configuration; and a release sheet positioned on the bottom surface to cover the second attachment area when the flashing assembly is in the first configuration.

2. The system of claim 1, wherein the flashing includes a bottom surface and a top surface, and wherein the first tape extends over the top surface.

3. The system of claim 2, wherein the first tape is positionable relative to the flashing when the flashing assembly is in the first configuration, and wherein the second attachment area is attached to the surface such that the first tape extends across an interface between the flashing and the surface.

4. The system of claim 1, wherein the first tape is attached to a top surface of the flashing, the flashing assembly further comprising a third tape attached to a bottom surface of the flashing.

5. The system of claim 1, wherein the flashing includes an edge having a shape, the first tape being shaped to correspond to the shape of the edge.

6. The system of claim 1, wherein the first tape comprises a single strip extending continuously along an edge of the flashing.

7. The system of claim 1, wherein the release sheet extends beyond the second attachment area to facilitate removal of the release sheet from the first tape.

8. The system of claim 1, wherein the first tape covers a planar portion of the flashing and extends about a non-planar portion of the flashing when the flashing assembly is in the first configuration and the second configuration.

9. The system of claim 8, wherein the first tape has a shape that allows the first tape to extend along at least a portion of the non-planar portion.

10. The system of claim 1 wherein the mount comprises a post stanchion.

11. The system of claim 10, further comprising:
  a third tape extending between a bottom surface of the flashing and the surface; and
  a fourth tape extending between a bottom surface of the post stanchion and the surface.

12. The system of claim 1, wherein the flashing is unattached to the mount when the flashing assembly is in the first configuration.

13. The system of claim 1, wherein the flashing is attached to the mount when the flashing assembly is in the second configuration such that the mount secures the flashing assembly to the surface.

14. The system of claim 1 further comprising a package comprising:
  a container defining an interior space to receive the flashing assembly; and
  a receptacle for receiving the release sheet when the release sheet is removed from the first tape, wherein the release sheet is removed from the first tape to allow the flashing assembly to attach to a surface.

15. The system of claim 14, wherein the flashing assembly is received in the interior space such that the release sheet is removed from the second attachment area while the flashing assembly is positioned in the interior space.

16. The system of claim 1, wherein the flashing assembly is a first flashing assembly, the system further comprising a second flashing assembly, wherein the first flashing assembly and the second flashing assembly are sized to fit within an interior space of a container in a stacked configuration.

17. The system of claim 1, wherein the release sheet is cut such that the release sheet covers the entire second attachment area and is removed from the second attachment area as a single piece.

\* \* \* \* \*